(12) United States Patent
Tanaka et al.

(10) Patent No.: US 6,509,533 B1
(45) Date of Patent: Jan. 21, 2003

(54) CONVEYOR, AND WEIGHING MACHINE AND METAL DETECTING MACHINE USING THE CONVEYOR

(75) Inventors: Osamu Tanaka, Atsugi (JP); Hiroyuki Sekiguchi, Atsugi (JP); Norikazu Murata, Atsugi (JP)

(73) Assignee: Anritsu Corporation, Tokyo (JP)

(*) Notice: Subject to any disclaimer, the term of this patent is extended or adjusted under 35 U.S.C. 154(b) by 0 days.

(21) Appl. No.: 09/700,758

(22) PCT Filed: May 27, 1999

(86) PCT No.: PCT/JP99/02791
§ 371 (c)(1),
(2), (4) Date: Nov. 20, 2000

(87) PCT Pub. No.: WO99/62796
PCT Pub. Date: Dec. 9, 1999

(30) Foreign Application Priority Data

May 29, 1998 (JP) ............................................ 10-149872
May 29, 1998 (JP) ............................................ 10-149873

(51) Int. Cl.[7] ........................ G01G 21/00; G01G 19/00
(52) U.S. Cl. ...................................... 177/126; 177/145
(58) Field of Search ............................... 198/813, 814, 198/835; 177/126, 127, 119, 145

(56) References Cited

U.S. PATENT DOCUMENTS

| | | | | |
|---|---|---|---|---|
| 3,456,776 A | | 7/1969 | Viene | 198/813 |
| 3,743,078 A | | 7/1973 | Pittoreau | 198/121 |
| 3,944,054 A | * | 3/1976 | Ensinger | 198/835 |
| 4,511,028 A | | 4/1985 | Meister | 198/497 |
| 4,846,338 A | | 7/1989 | Widmer | 198/831 |
| 5,022,514 A | * | 6/1991 | Lofberg | 198/813 |
| 5,205,400 A | | 4/1993 | Breuss et al. | 198/812 |
| 5,304,745 A | * | 4/1994 | Rusk et al. | 177/145 |
| 6,161,683 A | * | 12/2000 | Wallis | 198/813 |

FOREIGN PATENT DOCUMENTS

| | | |
|---|---|---|
| DE | 196 44 010 | 5/1998 |
| EP | 0 312 643 | 4/1989 |
| FR | 2 604 424 | 4/1988 |
| FR | 2 663 309 | 12/1991 |
| FR | 2 746 510 | 9/1997 |
| JP | 56-10632 | 1/1981 |
| JP | 1-90712 | 6/1989 |
| JP | 5-37732 | 5/1993 |
| JP | 7-237722 | 9/1995 |
| JP | 10-129821 | 5/1998 |

* cited by examiner

Primary Examiner—Randy W. Gibson
(74) Attorney, Agent, or Firm—Kanesaka & Takeuchi

(57) ABSTRACT

There is provided a conveyor capable of carrying out attachment and detachment of a portion of carrying an article easily and safely by a simple constitution in cleaning or the like and preventing parts from falling in attaching and detaching thereof. A support unit is provided with a carry unit and a motor unit respectively attachably and detachably. The carry unit is attachable to and detachable from the support unit in an upward direction. An output shaft of the motor unit can be connected to and detached from a drive roller of the carry unit by first and second connecting pieces. When a fixed state of the motor unit is released by releasing clamps, connection between the connecting peices is released and a state of fixing the carry unit to the support unit is released by releasing clamps, so that the carry unit can be removed in the upward direction.

9 Claims, 16 Drawing Sheets

CONVEYOR, AND WEIGHING MACHINE AND METAL DETECTING MACHINE USING THE CONVEYOR

TECHNICAL FIELD

The present invention relates to a conveyor for carrying articles, a measuring machine having the conveyor for measuring mass of article and a metal detector for detecting a metal object and particularly relates to a conveyor capable of easily interchanging a carry unit and a measuring machine as well as a metal detector using the conveyer.

BACKGROUND OF THE INVENTION

Conventionally, a conveyor for carrying articles is applied to a measuring machine for measuring mass of an article while carrying the article, a metal detector for detecting mixture of metal in the article while carrying the article and the like.

FIG. 18(a) illustrates a plane view showing a conventional measuring machine and FIG. 18(b) illustrates a side view.

A measuring machine 60 can measure mass of article by a measuring section while carrying the article by driving a conveyor 61. The conveyor 61 is constituted by a support unit 62 and a carry unit 63 attachable to and detachable from the support unit 62. The support unit 62 is constituted by a pair of side plates 62a and a drive motor 67. The carry unit 63 is constituted by a receive base 64, a drive roller 65a and a driven roller 65b provided at two side portions of the receive base 64 and an endless belt 66 between the rollers 65a and 65b.

The carry unit 63 is fixed and held by a fixing piece 69 in the attachment state. The carry unit 63 can be lifted and detached from the support unit 62 by releasing the fixing piece 69. The drive motor 67 is provided on the support unit 62 side and is connected to a rotating shaft of the drive roller 65a via a connecting belt 68.

The measuring section is constituted by, for example, a strain gage type load cell (hereinafter, abbreviated as load cell). The support unit 62 is mounted and fixed onto the load cell and the load cell measures a total of the conveyor 61 and mass of the article. There is constructed a constitution in which a measuring signal of the load cell is outputted to an operating section (not illustrated) and the mass of the article is calculated by subtracting a weight of the conveyor 61 by operation processing of the operating section.

According to the conveyor 61, there is needed maintenance and check such as periodically cleaning or interchanging respective constituent portions (for example, belt 66) of the carry unit 63. Particularly, when the article is food, sterilization or decontamination of the conveyor 61 portion is necessary.

However, attachment and detachment of the carry unit 63 to and from the support unit 62 cannot be carried out easily. In removing the carry unit 63, the connecting belt 68 expanded between the drive roller 65a and the drive motor 67 must be removed. For example, the drive motor 67 is removed from the support unit 62 by disengaging screws of a base seat of the drive motor 67 and the connecting belt 68 is removed. In addition thereto, in removing the connecting belt 68, attachment screws of a (safety) protection cover 68a of a connecting belt 68 need to be removed.

At this occasion, in a state in which the protection cover 68a is removed, the connecting belt 68 is exposed and accordingly, there causes a danger of pinching the hand or the like. Further, in attachment and detachment operations, parts of respective portions are liable to fall and there also is a concern of losing the parts. When the measuring machine 60 measures food, mixing parts into food must absolutely be avoided.

In order to resolve the above-described situation, there is constructed a constitution in which in transmitting drive force between the drive roller 65a and the drive motor 67 of the conveyor 61, instead of the above-described connecting belt 68, the drive roller 65a and the drive motor 67 are respectively provided with spur gears and connected by bringing the spur gears in mesh with each other.

Also in the constitution using the spur gears, the gears need to be in mesh with each other by a predetermined pitch (accuracy) and accordingly, it is difficult to simply connect the conveyor 61 without adjustment at the gear portion. Further, after adjustment, the drive motor 67 needs to be fixed firmly. Although when the mesh accuracy is alleviated by changing the shape of the gear or the like, the conveyor 61 can be made attachable and detachable at the gear portion, there poses a problem in which transmission characteristic of drive force (efficiency and durability) is deteriorated. Further, although detachment and attachment of the drive motor 67 is carried out by screws, the operation needs to carry out such that the screws are not lost, further, the drive motor 67 is firmly fixed.

The present invention has been carried out in order to eliminate the above-described drawbacks.

And it is an object thereof to provide a conveyor capable of easily and safely carrying out attachment and detachment of portions for carrying article in cleaning or the like by a simple constitution.

Further it is other object to provide a conveyor capable of preventing parts from being fallen in the attachment and detachment operation, a measuring machine for measuring mass of article and a metal detector for detecting a metal object in the article by using the conveyor.

DISCLOSURE OF THE INVENTION

In order to achieve the above-described object, according to a first aspect of the present invention, there is provided a conveyor comprising:

a motor unit including a motor and an output shaft for outputting a rotational force of the motor;

a support unit attached with the motor unit;

a carry unit including a drive roller rotated by receiving the rotational force, a driven roller and an endless belt expanded between the drive roller and the driven roller and made attachable to and detachable from the support unit only in an up and down direction;

a first connecting piece provided at one end of the output shaft; and a second connecting piece provided at one end of the drive roller for transmitting the rotational force by being engaged with the first connecting piece; and wherein the motor unit is fixed attachably to and detachably from the support unit by clamps, when the clamps are released, the motor unit is movable in a direction of a rotating shaft of the drive roller and engagement between the first and the second connecting pieces is released to thereby make the carry unit attachable to and detachable from the support unit in an upward direction.

According to the above-described constitution, the carry unit on the support unit can be attached and detached by operating to release the clamps. In attaching and detaching operation, the first and the second connecting pieces provided between the output shaft of the motor unit and the rotating shaft of the drive roller can be separated and removed. Thereby, attachment and detachment of the carry unit can easily be carried out by simple operation and cleaning of the carry unit can easily be carried out.

Further, according to a second aspect of the present invention, there may be constructed a constitution in which the first and the second connecting pieces are provided with a protection case for positioning axis centers of the output shaft of the motor unit and the drive roller by engaging the output shaft and the drive roller with each other and covering a connected portion thereof.

According to the above-described constitution, connecting portions of outer peripheries of the first and the second connecting pieces are covered by the protection case, rotating portions thereof are not exposed and safety in operating the conveyor and in the attachment and detachment operation can be ensured. Further, by fitting the protection case, a deviation between axis centers in connecting the first and the second connecting pieces is eliminated and axial position can be positioned and predetermined connecting accuracy can be ensured by simple operation.

Further, according to a third aspect of the present invention, there may be constructed a constitution in which the first and the second connecting pieces are formed by a metal;

wherein an intermediate disk made of a resin fixed to either of the first and the second connecting pieces is provided; and wherein a drive force in connecting the first and the second connecting pieces can be transmitted therebetween respectively via the intermediate disk.

According to the above-described constitution, the deviation between axis centers of the output shaft of the motor unit and the rotating shaft of the drive roller is absorbed by the intermediate disk even when there is angle of deviation. Further, the first and the second connecting pieces made of metal are not brought into direct contact with each other but connected via the intermediate disk made of resin and accordingly, there is no portion of coupling metals and friction therebetween can be minimized. Thereby, low noise formation, low vibration formation and long life formation of the connecting portion can be achieved and the reliability can be achieved. Even when the intermediate disk is worn or the like, the intermediate disk can easily be interchanged.

Further, according to a fourth aspect of the present invention, there may be constructed a constitution in which a fall preventive piece is provided between the motor unit and the support unit to thereby prevent the motor unit from falling when the clamps are released.

According to the above-described constitution, when the clamps are released in attaching and detaching the carry unit, safety formation can be achieved by being able to prevent the motor unit from falling.

Further, according to a fifth aspect of the present invention, there may be constructed a constitution in which a gravitational center of the motor unit is arranged to deviate in a direction of a gravitational center of the support unit. Thereby, the state of installing the conveyor can be stabilized.

Further, according to a sixth aspect of the present invention, there is provided a measuring unit wherein the support unit is mounted and fixed onto a measuring unit and he measuring unit measures a mass of an article carried and moved on the carry unit.

According to the above-described constitution, the carry unit of the measuring machine can simply be attached and detached and cleaning of the carry unit can simply be carried out. Particularly, in measuring food or the like, it is necessary to frequently carry out sterilization and decontamination of the carry unit and the cleaning operation can simply be carried out. Further, mixing parts into food can also be prevented.

Further, according to a seventh aspect of the present invention, there is provided a metal detector wherein the support unit is provided with a metal detection head having an opening portion substantially in a rectangular shape and the carry unit is arranged to pass in the opening portion of the detection head to thereby detect a metal object in the article carried and moved on the carry unit;

wherein the carry unit is attachable to and detachable from the support unit in the upward direction via the opening portion of the detection head.

According to the metal detector having the above-described constitution, the carry unit is arranged to pass through the opening portion for the detection head, a total of the carry unit is unitized and attachable to and detachable from the support unit in the upward direction so that the carry unit can simply be removed via the opening portion. Accordingly, maintenance, cleaning or the like thereof can simply be carried out.

Further, according to an eighth aspect of the present invention, there is provided a conveyor comprising a motor unit including a motor and an output shaft for outputting a rotational force of the motor, a support unit attached with the motor unit, and a carry unit including a drive roller rotated by receiving the rotational force, a driven roller and an endless belt expanded between the drive roller and the driven roller and made attachable to and detachable from the support unit:

wherein the carry unit is attachable to and detachable from the support unit;

wherein the carry unit comprises:

a receive base having a flat face made horizontal;

the drive roller driven to rotate centering on a rotating shaft supported by one end portion of the receive base;

the driven roller rotated centering on a driven shaft provided at other end portion of the receive base;

a pivoting portion pivotable in a direction of making the driven roller proximate to the drive roller side; and a belt in an endless shape expanded above the flat face of the receive base between the drive roller and the driven roller;

wherein the belt can be removed from the carry unit by loosening tension of the belt by pivoting the driven roller.

According to the above-described constitution, in removing the belt from the carry unit, when the pivoting portion on the driven roller side is pivoted, the driven roller is made proximate to the drive roller side and the belt can easily be removed. Conversely, in attaching the belt to the carry unit, the belt may only be expanded between the respective rollers and the pivoting portion may be returned to the original position, predetermined tension can be exerted to the belt and the previous state can be recovered.

Further, according to a ninth aspect of the present invention, there is provided a measuring unit using the conveyor, wherein the support unit is mounted and fixed onto a measuring unit and the measuring unit measures a mass of an article carried and moved on the carry unit.

According to the above-described constitution, the belt can simply be attached to and detached from the carry unit of the measuring machine and cleaning of the carry unit can simply be carried out. Particularly, in the case of measuring food or the like, it is necessary to frequently carry out sterilization and decontamination of the carry unit and the cleaning operation can simply be carried out. Further, mixing parts into food can also be prevented.

Further, according to a tenth aspect of the present invention, there may be constructed a constitution in which the support unit is provided with a support plate capable of supporting the carry unit to be erected and a driven shaft of the driven roller is brought into contact with an upper end edge of the support plate to thereby restrict pivotal movement thereof and to thereby position an upper peripheral face of the driven roller to the same height as heights of an upper peripheral face of the drive roller and the flat face of the receive base.

According to the above-described constitution, when the carry unit is mounted and fixed onto the support unit, the driven shaft of the driven roller is brought into contact with and supported by the upper end edge of the support plate and the above-described pivotal movement is restrained. Thereby, the upper peripheral face of the pivoting roller is disposed at the same height as the heights of the upper peripheral face of the drive roller and the flat face of the receive base which are previously made the same and the belt expanded between the drive roller and the driven roller can be disposed along the flat face of the receive base with no stepped difference. Therefore, carry performance of article on the belt can be promoted and stable measuring operation can be carried out by eliminating measuring error.

Further, according to an eleventh aspect of the present invention, there may be constructed a constitution in which the pivoting shaft is disposed on an upper side of a base line connecting centers of the rotating shaft of the drive roller and the driven shaft of the driven roller and the driven shaft is urged to the upper end edge of the support plate by the tension of the belt.

According to the above-described constitution, the tension of the belt per se expanded between the drive roller and the driven roller, constitutes urging force for urging the driven shaft in the lower direction via the pivoting portion. Thereby, the driven roller is pressed to and held by the support plate and a positional relationship among the upper peripheral face of the driven roller, the upper peripheral face of the drive roller and the flat face of the receive base the heights of which are made the same, can be maintained.

Further, according to a twelfth aspect of the present invention, there may be constructed a constitution in which the pivoting portion is provided with pressing means for pressing the driven roller in a direction of separating the driven roller from the drive roller and an urging force by the tension of the belt is assisted by a pressing force of the pressing means.

According to the above-described constitution, the pressing means tightens the belt and accordingly, the urging force for urging the driven shaft to the upper end edge of the support plate is assisted and the positional relationship among the upper peripheral face of the driven roller, the upper peripheral face of the drive roller and the flat face of the receive base the heights of which are made the same, can be maintained sufficiently and firmly.

Further, according to a thirteenth aspect of the present invention, there may be constructed a constitution in which the driven shaft is urged to the upper end edge of the support plate by urging means.

According to the above-described constitution, the positional relationship among the upper peripheral face of the driven roller, the upper peripheral face of the drive roller and the flat face of the receive base the heights of which are made the same, can be maintained without arranging the pivoting shaft to the upper side position or using the pressing means.

BEST MODE 1 FOR CARRYING OUT THE INVENTION

Figure 1:
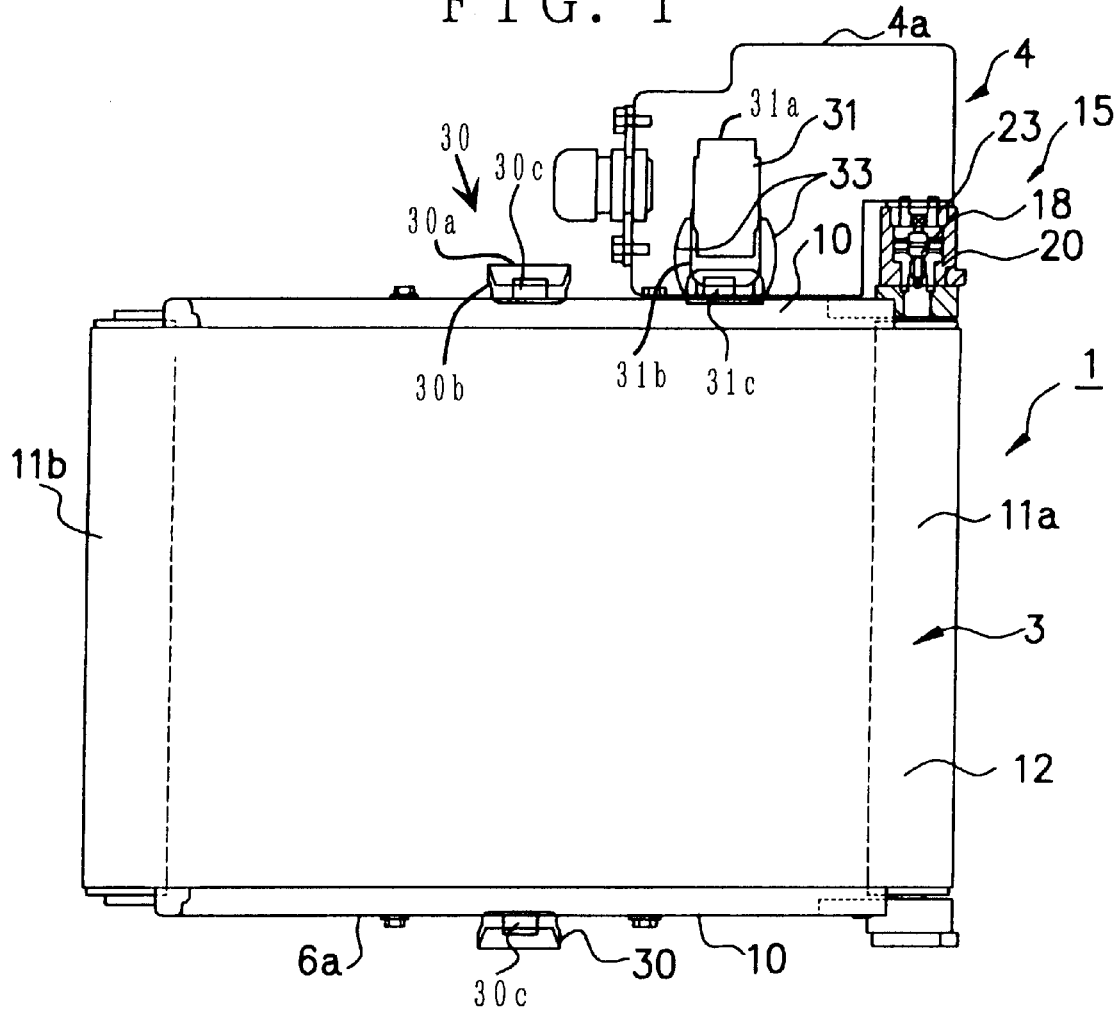
FIG. 1 is a plane view showing a measuring machine according to a first embodiment of the present invention.
Figure 2:
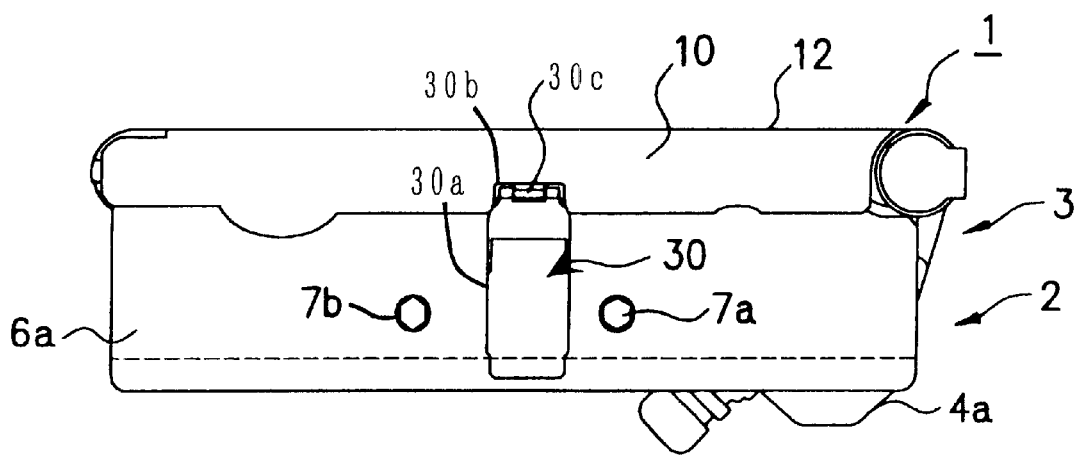
FIG. 2 is a front view of the measuring machine.

FIG. 1 is a plane view showing essential portions of a measuring machine according to the present invention, FIG.

Figure 3:
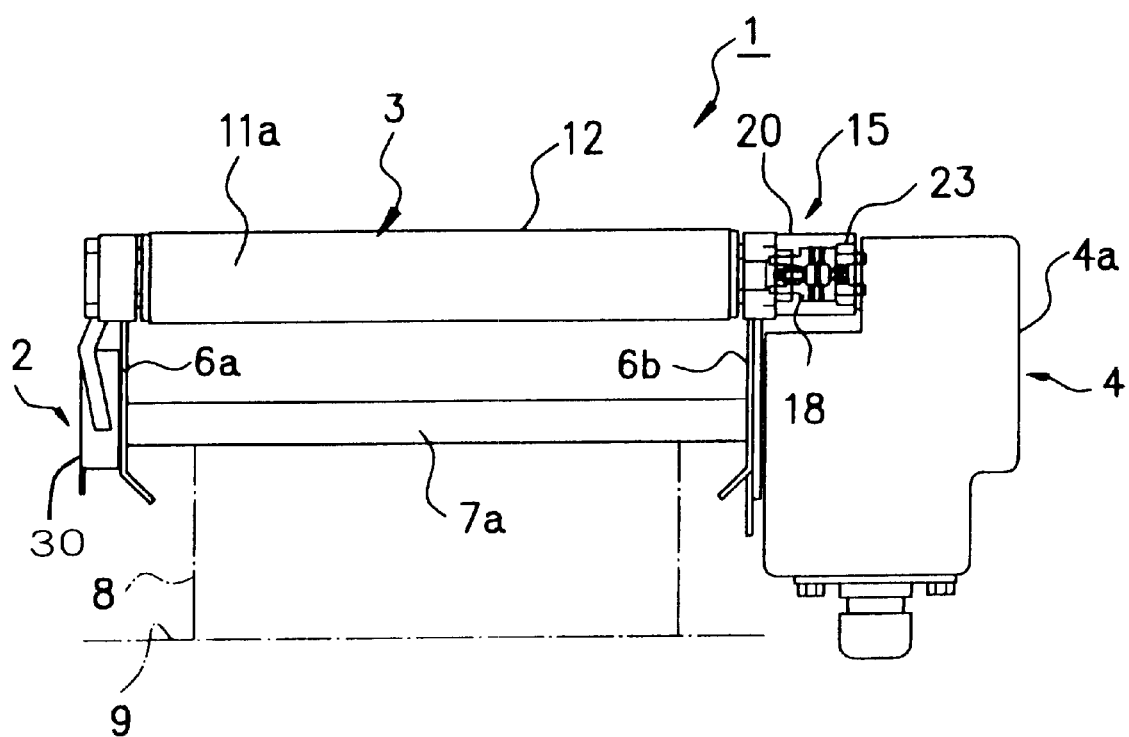
FIG. 3 is a side view of the measuring machine.

2 is a front view thereof and FIG. 3 is a side view thereof. In these drawings, there is illustrated a conveyor 1 provided at an upper position of the measuring machine.

The conveyer 1 is generally constituted by a support unit 2, a carry unit 3 and a motor unit 4.

The support unit 2 is constituted by a pair of left and right side plates 6a and 6b and frames 7a and 7b fixedly supporting the side plates 6a and 6b. The frames 7a and 7b are fixed above a measuring section 8 for measuring a total of the conveyor 1 and mass of an article. The measuring section 8 is constituted by, for example, a load cell or an electronic balance scale. A measuring signal of the measuring section 8 is outputted to an operating section (not illustrated) and mass of the article is calculated by subtracting the weight of the conveyor 1 by operation processing of the operating section. The measuring section 8 is fixed on a base 9.

The carry unit 3 is attachable to and detachable from the support unit 2 from above. The carry unit 3 is generally constituted by a receive base 10 having a width and a length substantially the same as those of the support unit 2, a drive roller 11a and a driven roller 11b provided at both ends of the receive base 10 and a belt 12 in an endless state expanded between the rollers 11a and 11b.

According to the receive base 10, an inner portion thereof is reinforced by bridges or the like in longitudinal and transverse directions for supporting a load of the article carried on the belt 12.

The motor unit 4 is provided at the side plate 6b of the support unit 2 on one end portion side of the drive roller 11a. The motor unit 4 is constituted by a drive motor and a reduction gear which are contained in a waterproof case 4a. An output shaft 4b of the motor unit 4 is arranged at a position coaxial with the drive roller 11a and these are connected by a connecting portion 15.

The connecting portion 15 is constituted by a pair (male, female) of connecting pieces 18 (18a, 18b) respectively fixed to the output shaft 4b of the motor unit 4 and a rotating shaft 11b of the drive roller 11a.

Figure 4:
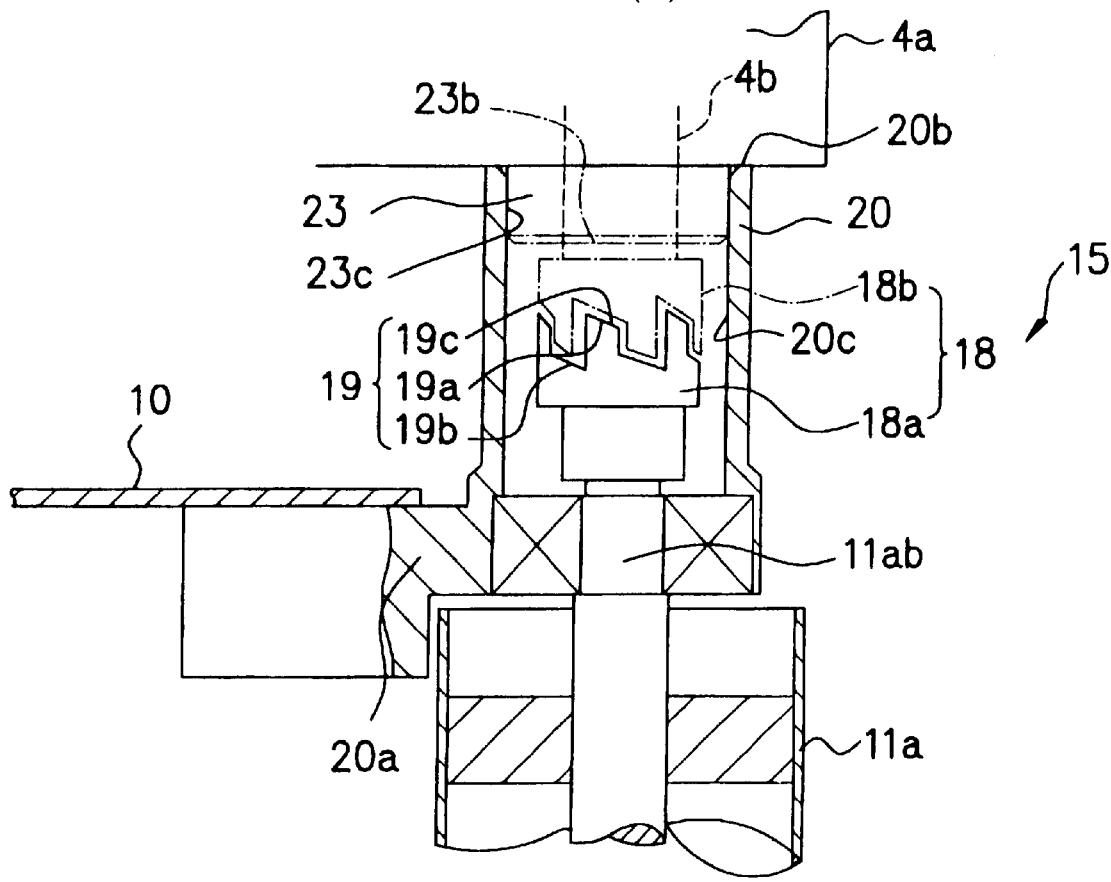
FIG. 4(a) illustrates a plane sectional view showing a connecting piece.
FIG. 4(b) illustrates a side view showing a connecting piece.
Figure 4:
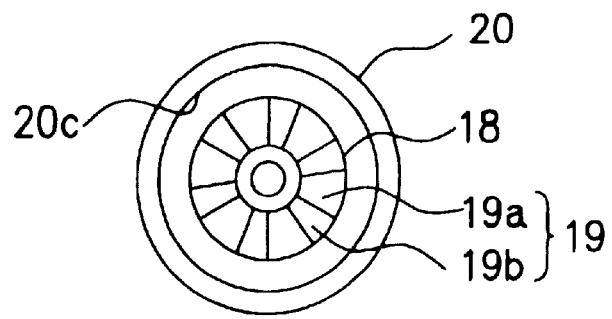

FIG. 4(a) illustrates a plane sectional view showing the connecting portion 15. FIG. 4(b) illustrates a side view showing the connecting portion 15.

The connecting piece 18a on one side is provided with 15 engagement teeth 19 having a predetermined teeth number in which pluralities of mounting portions 19a and valley portions 19b are formed in shapes of recesses and projections radially at respective predetermined angles centering on the rotational center. The connecting piece 18b on the other side is provided with engagement teeth having the same shapes in mesh with the engagement teeth 19.

End faces 19c of the engagement teeth 19 are formed to incline by a predetermined angle relative to a rotational direction. The end faces 19c guide mutual mesh engagement when the connecting pieces 18a and 18b become proximate to each other from the axial direction.

The connecting piece 18 is contained at inside of a protection cover 20 in a cylindrical shape. According to the protection cover 20, a base end portion 20a thereof is fixed to the receive base 10 concentrically with a rotating shaft 11ab of the drive roller 11a and is provided with a through hole which the rotating shaft 11ab penetrates. Further, the protection cover 20 is provided with a length and an inner diameter of a predetermined diameter capable of containing the connecting pieces 18a and 18b. Further, an inner periphery of a front end portion 20b thereof is formed in a taper shape.

In the meantime, explaining the connecting portion 15 on the motor unit 4 side, the waterproof cover 4a is projected and fixed with a receive seat (protection cover) 23 at a portion of the output shaft 4b concentrically therewith. The receive seat 23 is constituted by substantially a circular cylinder shape having an outer diameter of a predetermined diameter and a front end portion 23b thereof is formed in a taper shape.

Here, an inner peripheral face 20c of the protection cover 20 and an outer peripheral face 23c of the receive seat 23 are fitted to each other by predetermined accuracy and by the fitting operation, axis cores of the connecting pieces 18a and 18b are positioned to align.

The carry unit 3 and the motor unit 4 are attached to the support unit 2 via clamps 30 and 31. Explaining the clamp 30, the clamp 30 is constituted by a lever 30a and a claw 30b which are provided at each of the side plates 6a and 6b of the support unit 2 and are pivotable. In the meantime, the carry unit 3 is provided with engagement pieces 30c engaging with the claws. When the lever 30a is pushed in a state in which the claw 30b of the clamp 30 is engaged with the engagement piece 30c and a force of a toggle exceeding a pivotal axis of the claw 30b is exerted, in the state of pushing in the lever 30a, the claw 30b holds a state of engaging with the engagement piece 30c. Also with regard to the clamp 31, similar respective portions 31a through 31c are provided and the engagement state is held by providing the toggle force. Further, in releasing the engagement state, the engagement piece levers 30a and 31a may be pulled up reversely.

By the above-described clamps 30, the carry unit 3 is fixed and held at an upper portion of the support unit 2.

The clamps 31 are provided at at least two faces of the waterproof cover 4a of the motor unit 4. The clamps 31 are engaged with the engagement pieces 31c at the side plate 6b opposed thereto. Further the clamps 31 fix and hold the motor unit 4 at a side position of the support unit 2 (drive roller 11a).

Fall preventive pieces 33 are further provided between the clamps 31 provided at the motor unit 4 and the side plate 6b. The fall preventive pieces 33 hold the motor unit 4 in a state of hanging from the side plate 6b side in a state that fixing by the clamps 31 is released, to thereby prevent the motor unit 4 from falling. For example, there is constructed a constitution in which a chain or a plate member having a predetermined length is provided between the clamp 31 and the side plate 6b or there are provided a screw for fixing the motor unit 4 and the side plate 6b and a flange at an end portion of the screw to thereby prevent the screw from falling. The fall preventive piece 33 holds the motor unit by a movement amount to a degree by which connection of the connecting pieces 18a and 18b the connecting portion 15 is brought into a separated state.

According to the conveyor 1 having the above-described constitution, rotational force of the drive motor of the motor unit 4 is decelerated via the reduction gear and the output shaft 4b is rotated. The output shaft 4b is connected to the rotating shaft 11ab of the drive roller 11a of the carry unit 3 via the connecting pieces 18 of the connecting portion 15. Thereby, the drive roller 11a is rotated and the belt 12 expanded between the drive roller 11a and the driven roller 11b is moved in one direction.

When an article is mounted on the belt 12, the measuring section 8 measures the conveyor 1 and the mass of the article. The operation section calculates the mass of the article by subtracting mass of the conveyor 1 by operation processing based on the measuring signal. The operation section carries out a control of determining acceptability of the article in accordance with the mass of the article, selecting the article by the mass or the like.

Figure 5A:
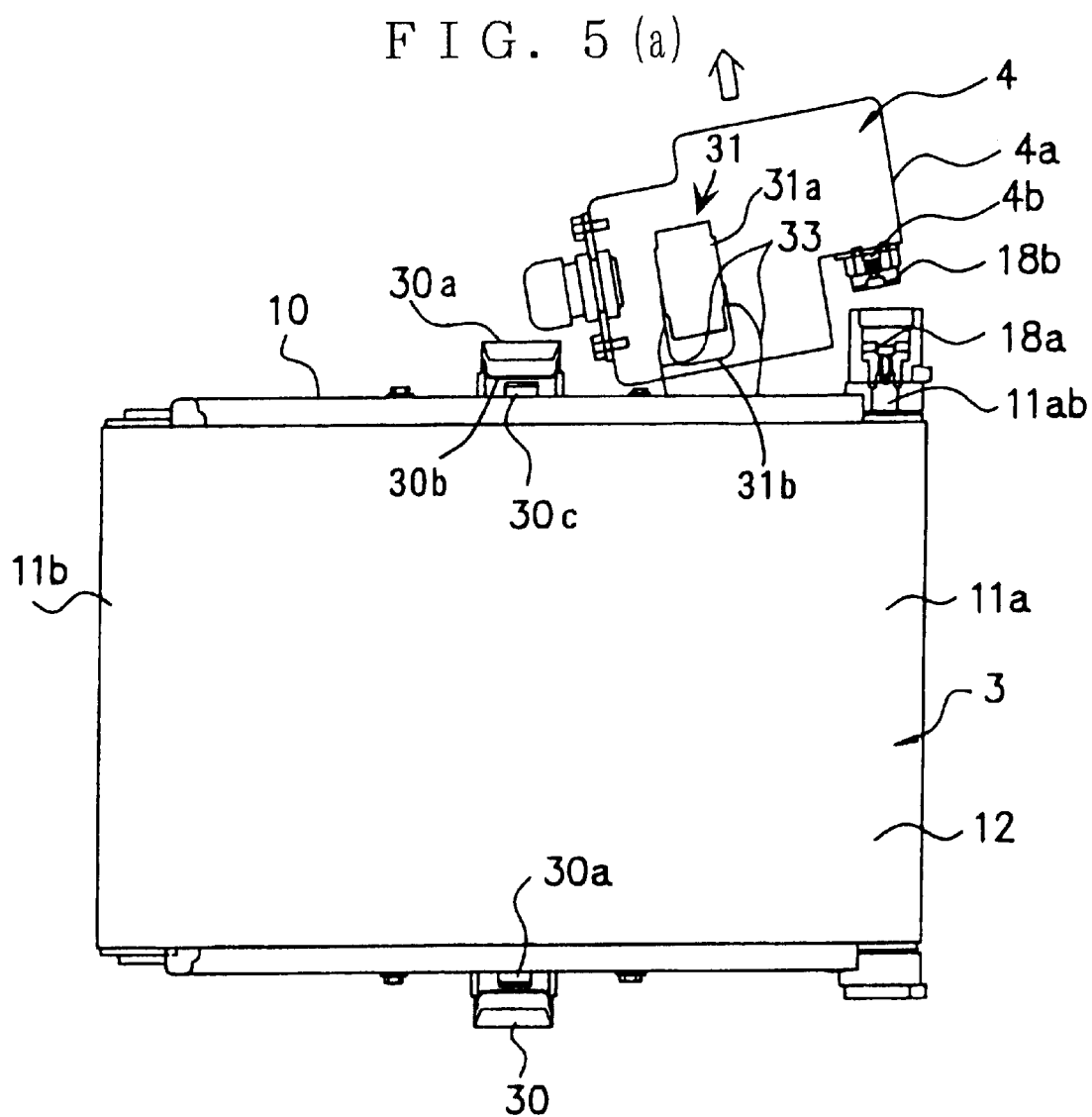
FIG. 5(a) illustrates a plane view showing attachment and detachment operation of a carry unit.
Figure 5B:
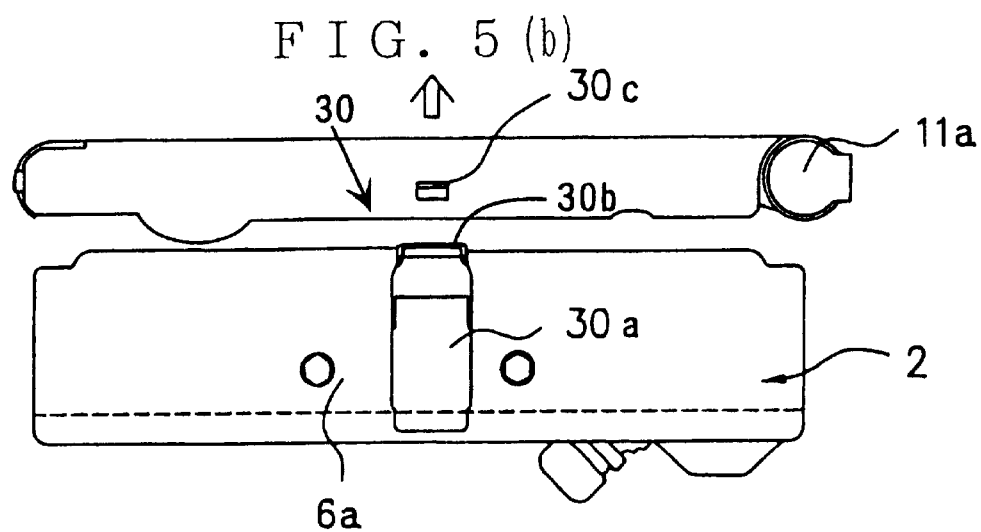
FIG. 5(b) illustrates a side view showing attachment and detachment operation of a carry unit.

Next, an explanation will be given of attachment and detachment operation of the carry unit 3 according to the above-described constitution. FIG. 5(a) illustrates a plane view showing the attachment and detachment operation. FIG. 5(b) illustrates a side view showing the attachment and detachment operation.

The carry unit 3 is removed from the support unit 2 for periodical cleaning (sterilization, decontamination) or maintenance.

Thereby, a connected state of the connecting portion 15 connecting the output shaft 4b of the motor unit 4 and the rotating shaft 11ab of the drive roller 11a is released. That is, the state of fitting the protection cover 20 and the receive seat 23 is released and the state of bringing the connecting pieces 18 in mesh with each other is released. Further, the motor unit 4 is held in the state of hanging from the side plate 6b by the fall preventive pieces 33.

In detaching the carry unit 3, the clamps 30 for holding to fix the carry unit 3 and the support unit 2 are operated to release. Further, the clamps 31 holding connection between the carry unit 3 and the motor unit 4 are operated to release.

Therefore, the carry unit 3 can be detached in the upper direction of the support unit 2.

In attaching the carry unit 3 to the support unit 2 thereafter, attachment can be carried out simply by operation reverse to the above-described.

That is, the carry unit 3 is mounted to the support unit 2 from above and the carry unit 3 is fixed and held by the clamps 30. Thereafter, the motor unit 4 may be fixed to the support unit 2 by the clamps 31.

At this occasion, the motor unit 4 and the drive roller 11a are connected by the connecting portion 15. That is, in fixing the motor unit 4 to the side plate 6b of the support unit 2, by fitting the receive seat 23 to the protection cover 20, the connecting pieces 18a and 18b are brought in mesh with each other such that axis central positions thereof are aligned. Further, according to the connecting pieces 18a and 18b, the end faces 19c of the engagement teeth 19 are respectively inclined by the predetermined angle and accordingly, in making the connecting pieces 18a and 18b proximate to each other in the axial direction, even when mountains and valleys of teeth faces are not matched, the mesh can be produced by rotating these relative to each other.

Further, in the above-described measuring operation, the portion of connecting the motor unit 4 and the drive roller 11a is covered by the protection cover 20 of the connecting portion 15. Thereby, the rotating portion (connecting pieces 18a, 18b or the like) is not exposed to outside and safety formation can be achieved.

According to the above-described embodiment, in order to release the connection between the rotating shaft 11ab of the drive roller 11a and the output shaft 4b of the motor unit 4, the state of fixing and holding the motor unit 4 can be released by operating the clamps 31.

Figure 6:
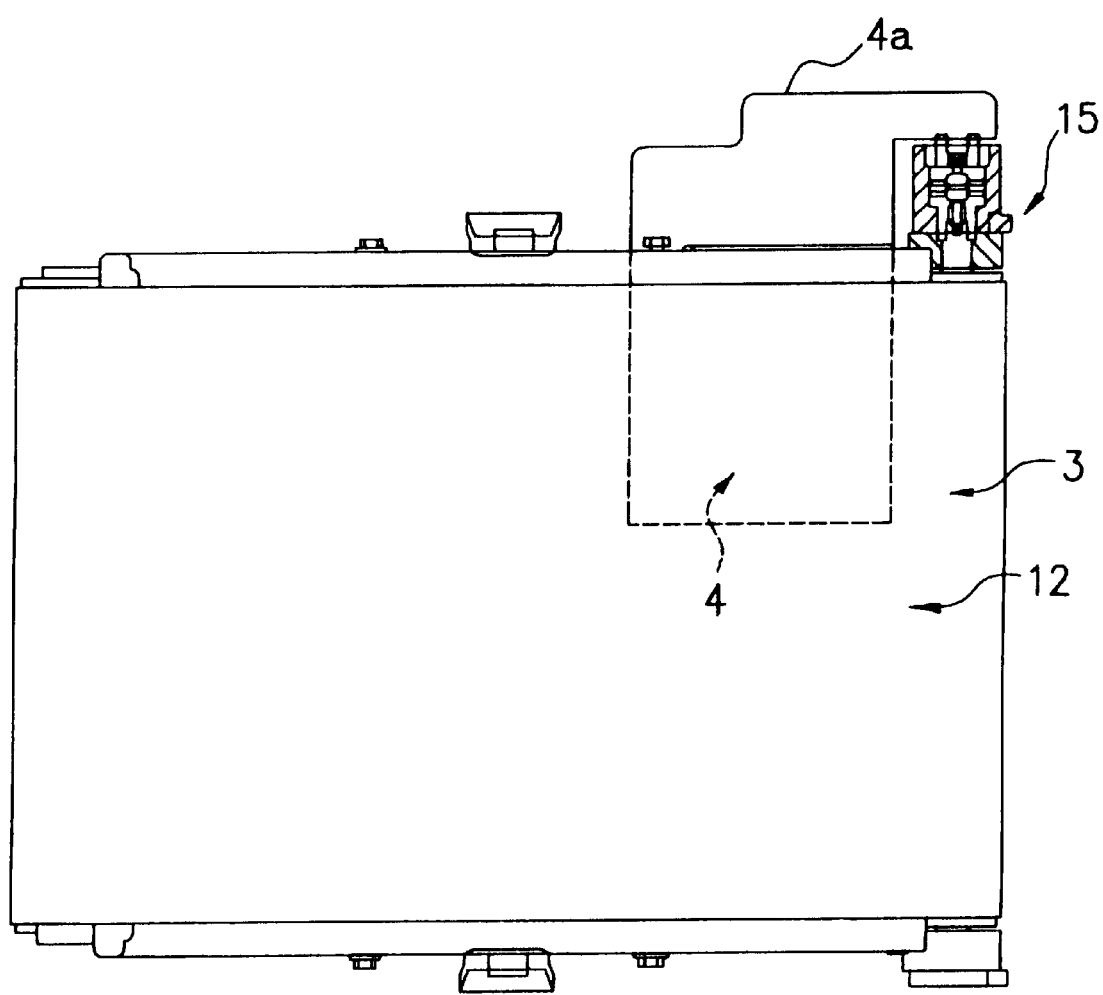
FIG. 6 is a plane view showing a modified example of arrangement of a motor unit.

Next, FIG. 6 is a plane view showing a modified example of the above-described embodiment.

As illustrated, according to the motor unit 4, a portion thereof is provided to deviate toward the inner direction of the support unit 2. That is, a position of a gravitational center of the motor unit 4 having predetermined mass is arranged to be proximate to a position of a gravitational center of the support unit 2.

Specifically, the motor unit 4 is provided at a position outward from the side plate 6b such that at an inner portion thereof, the drive motor is provided at a position inward from the side plate 6b (between side plates 6a and 6b) and a plurality of gears of the reduction gear connect the rotating shaft of the drive motor and the output shaft 4b.

Thereby, four corner error in measuring by the measuring section 8 of the measuring machine can be reduced and measuring accuracy can be promoted. Further, even with a constitution of only the conveyor which is not provided with the measuring section 8, weight of the conveyor is not deviated to one portion and the installment state can be stabilized.

BEST MODE 2 FOR CARRYING OUT THE INVENTION

Figure 7:
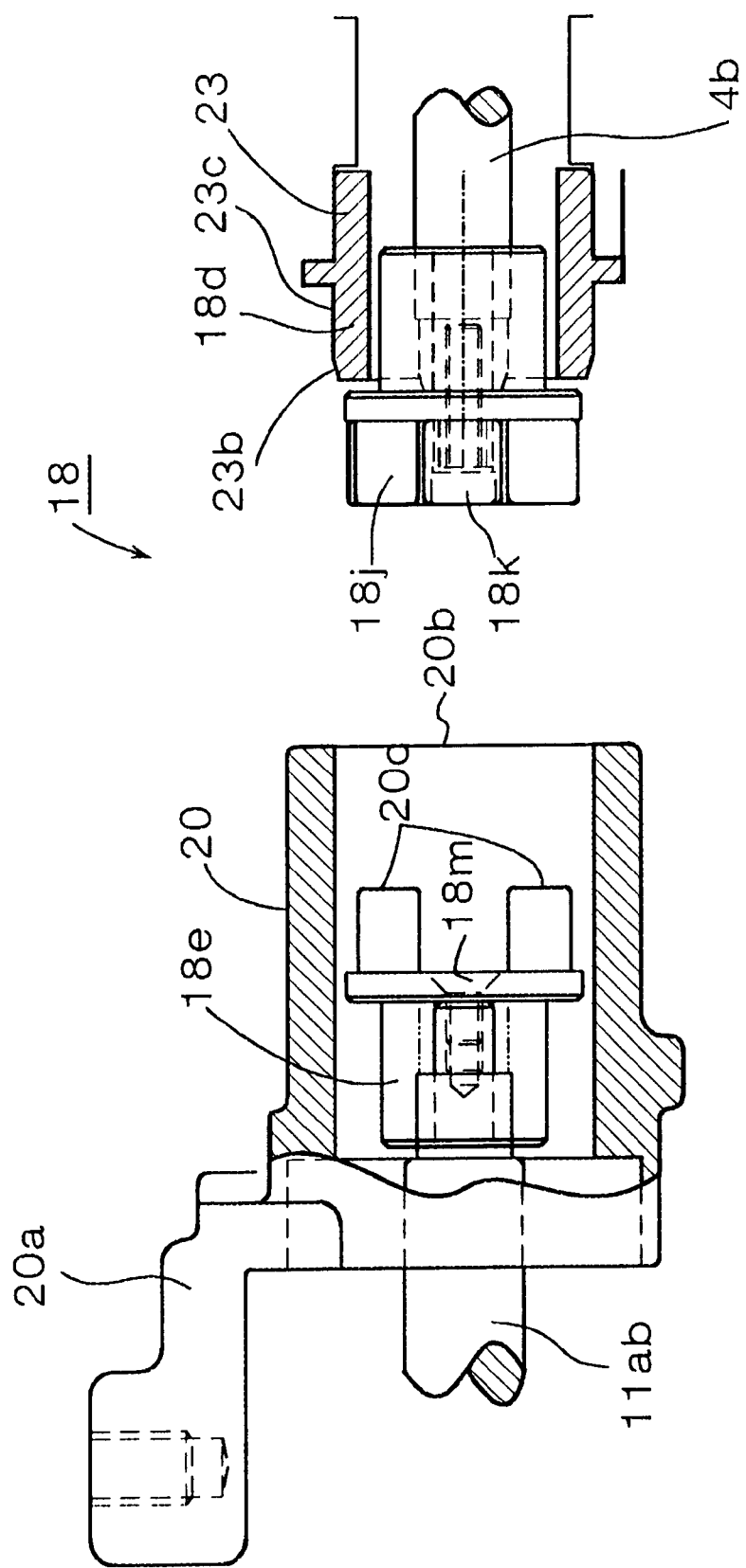
FIG. 7 is a plane view showing a constitution of a connecting piece according to a second embodiment of the present invention.
Figure 8:
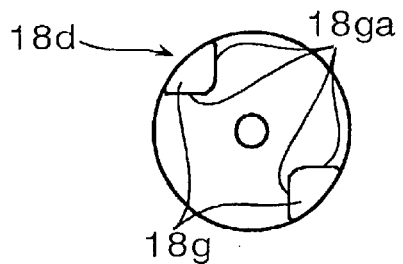
FIG. 8(a) illustrates a side view showing a coupling.
FIG. 8(b) illustrates a side view showing a coupling.
FIG. 8(c) illustrates a side view showing an intermediate disk.
FIG. 8(d) illustrates a side view showing a state in which the intermediate disk is attached to one of the couplings.
Figure 8:
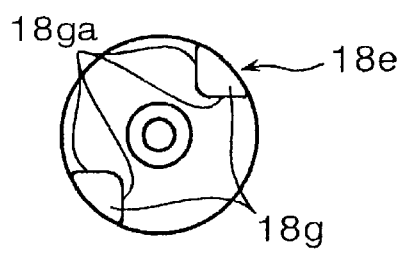
Figure 8:
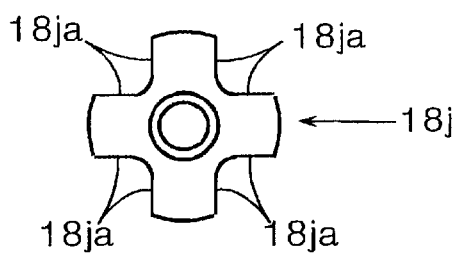
Figure 8:
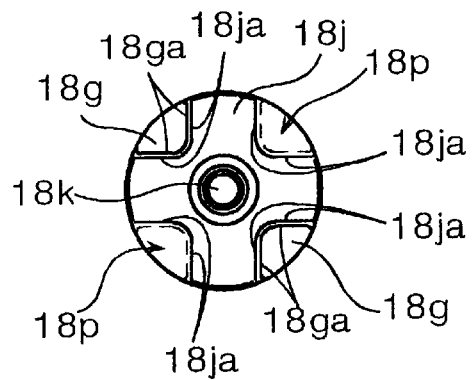

Next, FIG. 7 is a plane view showing another embodiment of a connecting piece, FIGS. 8(a) and 8(b) are side views of respective couplings, FIG. 8(c) is a side view of an intermediate disk and FIG. 8(d) is a side view showing a state in which the intermediate disk is attached to one of the couplings.

The output shaft 4b of the motor unit 4 and the rotating shaft 11ab of the drive roller 11a are connectable by the connecting piece 18. The connecting piece 18 comprises a connecting piece 18d on the motor unit 4 side and a connecting piece 18e on the drive roller 11a side having substantially the same constitution using a metal material.

The connecting piece 18d is fixed to the output shaft 4b by a bolt 18k along with an intermediate disk 18j. The connecting piece 18e is fixed to the rotating shaft 11ab by a screw 18m.

Engaging projections 18g are formed to project at two locations on a circumference with the rotational center as center thereof at each of the connecting pieces 18d and 18e. The engaging projection 18g is constituted by substantially a triangular shape in the side view and respective inclined sides 18ga are formed in parallel with each other and separated from each other at a predetermined interval relative to an imaginary line passing through an axis center of the connecting piece 18.

As shown by FIG. 8(c), the intermediate disk 18j is formed substantially in a cross shape having a predetermined width. The intermediate disk 18j is molded by resin of ultra high molecular polyethylene, MC nylon, polyacetal or the like. There is used a material excellent in mechanical strength, self lubricity, friction resistance, heat resistance and moldability and having low water absorption performance.

As shown by FIG. 8(d), according to the intermediate disk 18j, in a state of being attached to the connecting piece 18d, respective coupling sides 18ja are brought into contact with the inclined sides 18ga of the connecting piece 18d with a predetermined allowance.

Under the state, on the connecting piece 18d side, the engaging projections 18g of the connecting piece 18e are engaged with engaging portions 18p in an opened state with a predetermined allowance. Thereby, the output shaft 4b of the motor unit 4 and the rotating shaft 11ab of the drive roller 11a can be connected to each other and separated from each other.

The connecting piece 18d is contained at inside of the protection cover 20 in the cylindrical shape. Constitutions of the protection cover 20 and respective portions of the receive seat 23 are similar to the above-described and attached with the same notations and an explanation thereof will be omitted.

The inner peripheral face 20c of the protection cover 20 and the outer peripheral face 23c of the receive seat 23 are fitted to each other with predetermined accuracy and by the fitting operation, axis cores of the connecting pieces 18d and 18e are positioned to align.

Further, by using the above-described connecting pieces 18d and 18e, even when there is a deviation of axis center or deviation of angle between the output shaft 4b of the motor unit 4 and the rotating shaft 11ab of the drive roller 11a, the deviations can be absorbed by the intermediate disk 18j.

Further, there is constructed the constitution in which the connecting pieces 18d and 18e are not brought into direct contact with each other but are connected with each other via the intermediate disk 18j and therefore, there is no portion of metals in contact with each other. That is, the inclined sides 18ga of the connecting pieces 18d and 18e and the coupling sides 18ja of the intermediate disk 18j are brought into contact of metal and resin and friction therebetween can be minimized. Thereby, low noise formation, low vibration formation and long life formation of the connecting portion 18 can be achieved and the reliability can be promoted.

Further, even when the axis centers of the output shaft 4b of the motor unit 4 and the rotating shaft 11ab of the drive roller 11a are shifted from each other, wear or twist of bearings of the output shaft 4b and the rotating shaft 11ab can be prevented. Further, one of the output shaft 4b and the rotating shaft 11ab can also be prevented from being warped or flexed relative to the other thereof.

In the meantime, by time-sequential use, the intermediate disk 18j on the resin side is worn by friction at the coupling portions of the connecting pieces 18d and 18e and the intermediate disk 18j. However, the intermediate disk 18j can be interchanged by a new one thereof by simple operation of operating to attach and detach the bolt 18k.

Although according to the above-described embodiment, an explanation has been given of the constitution in which the intermediate disk 18j is fixed to the connecting piece 18d side, the present invention is not limited thereto but the intermediate disk 18j may be fixed to the connecting piece 18e side and also in this case, operation and effect similar to the above-described can be achieved.

BEST MODE 3 FOR CARRYING OUT THE INVENTION

Next, an explanation will be given of Embodiment 3 according to the present invention. Embodiment 3 is constructed by a constitution particularly for facilitating attachment and detachment of the belt 12. Here, the same notations are attached to the same constituent portions as those in the above-described embodiments and a detailed explanation thereof will be omitted.

Figure 9:
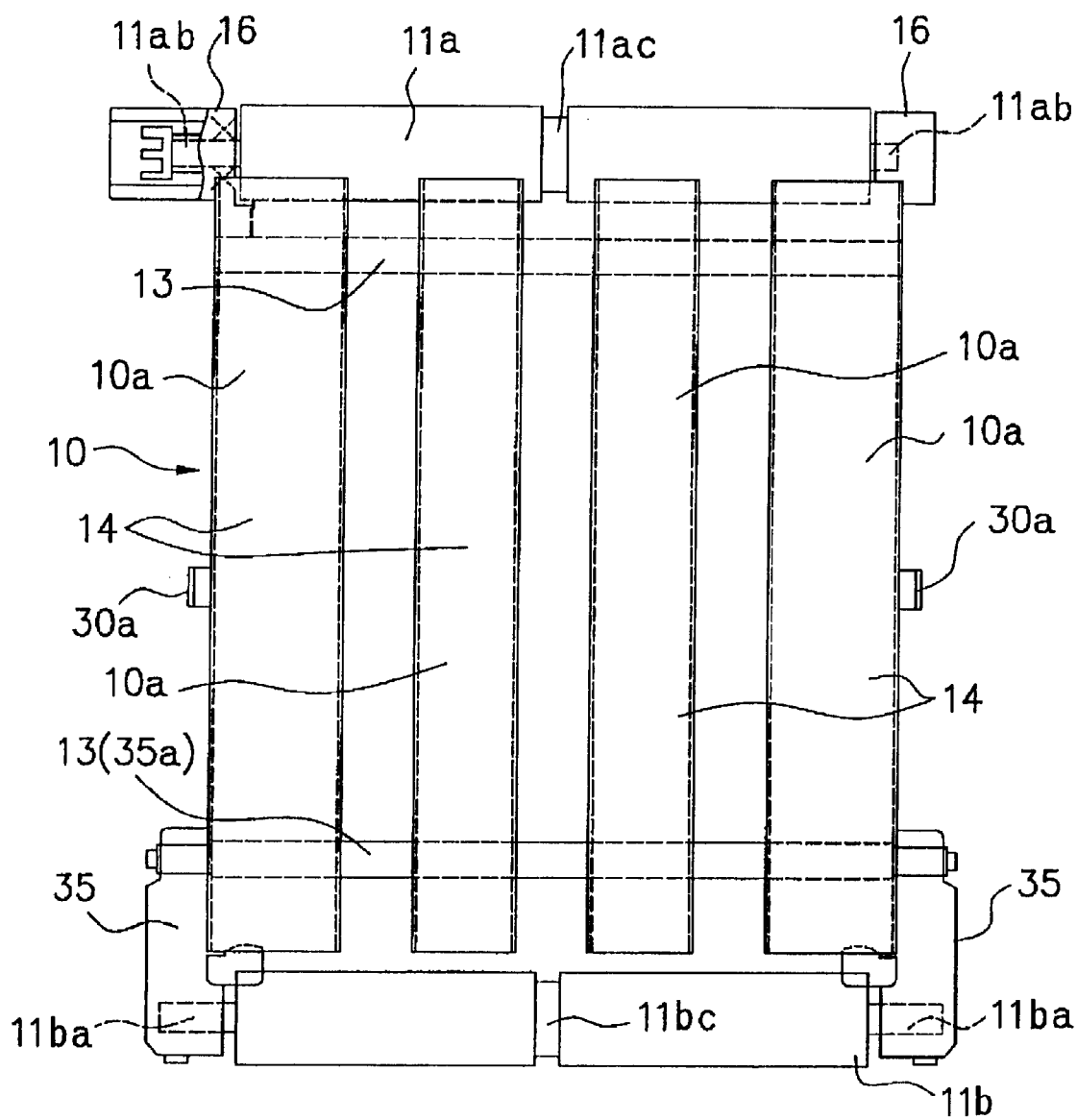
FIG. 9(a) illustrates a front view showing a receive base of a carry unit according to a third embodiment of the present invention.
FIG. 9(b) illustrates a side view showing a receive base of a carry unit.
FIG. 9(c) illustrates a front view showing a receive base of a carry unit.
Figure 9:
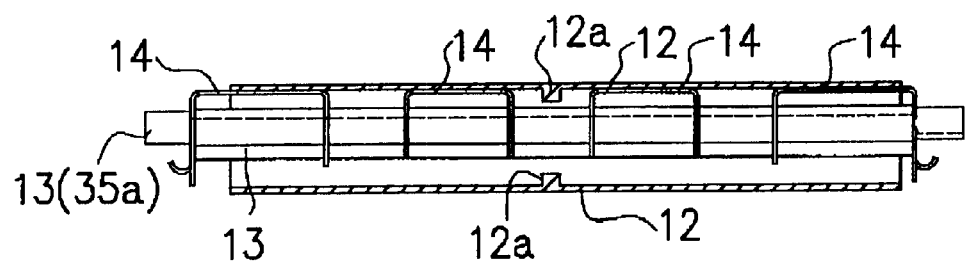
Figure 9:
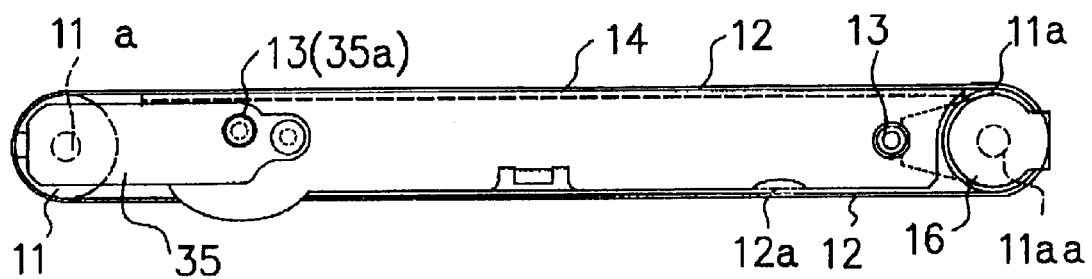

FIG. 9(a) illustrates a front view showing the receive base 10 of the carry unit 3. FIG. 9(b) illustrates a side view showing the receive base 10 of the carry unit 3. FIG. 9(c) illustrates a front view. The receive base 10 is provided with a plurality (four in the drawings) of receive portions 10a each having a section substantially in a channel-like shape having an opening portion on a lower side continuously in the length direction.

A plurality (two in the drawings) of the support rods 13 orthogonal to the length direction is fittedly inserted to side portions of the respective receive portions 10a for connecting and fixing the respective receive portions 10a in parallel with each other to thereby constitute left and right width of the receive base 10.

According to the receive base 10, upper faces of the respective receive portions 10a constitute flat faces 14 having the same height. Further, the respective support rods 13 are fittedly inserted at vicinities of respective end portions of the receive base 10 in the length direction.

The receive base 10 may not be limited to the above-described constitution but may be constituted such that a single piece of the receive portion 10a having a section substantially in a channel-like shape opened to the lower side continuously in the length direction constitutes the width in left and right direction, and the support rods 13 are fixed between side portions of the single piece of the receive portion 10a to thereby constitute the flat face 14.

In this way, according to the receive base 10, the left and right width direction and the length direction are reinforced by the side portions of the receive portions 10a and the support rods 13 and the load of the article carried on the belt 12 is supported by the flat faces 14.

The rotating shaft 11ab of the drive roller 11a is supported by bearing portions 16 fixed to one end of the receive base 10 in the length direction. The bearing portions 16 are arranged with bearings (not illustrated) for making the rotating shaft 11ab rotatable. Further, according to the drive roller 11a, the flat faces 14 of the receive base 10 and an upper peripheral face of the drive roller 11a are provided with the same height.

The driven roller 11b is arranged to the other end of the receive base 10 in the length direction via pivoting portions 35. The pivoting portions 35 are pivoted with the support rod 13 projected from two side plates 10d of the receive base 10 as a pivoting shaft 35a. The pivoting portions 35 are respectively provided at both side portions of the receive base 10 for axially supporting the driven roller 11b by pivoting end sides thereof.

Figure 10:
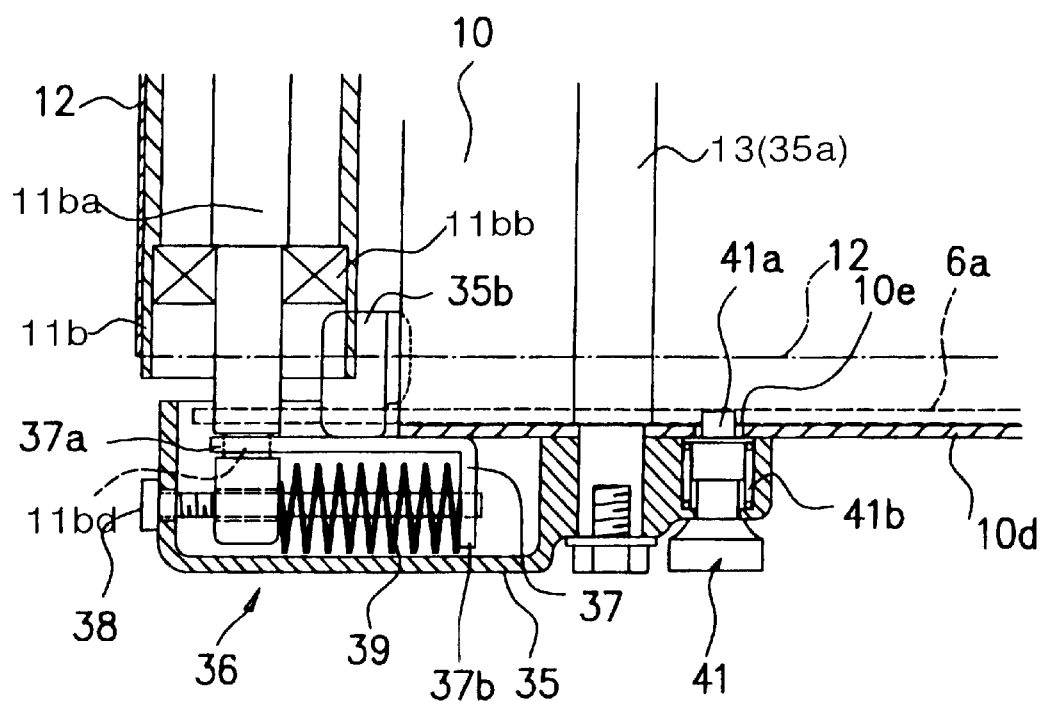
FIG. 10 is a plane sectional view showing a constitution of the pivoting portion.
Figure 11:
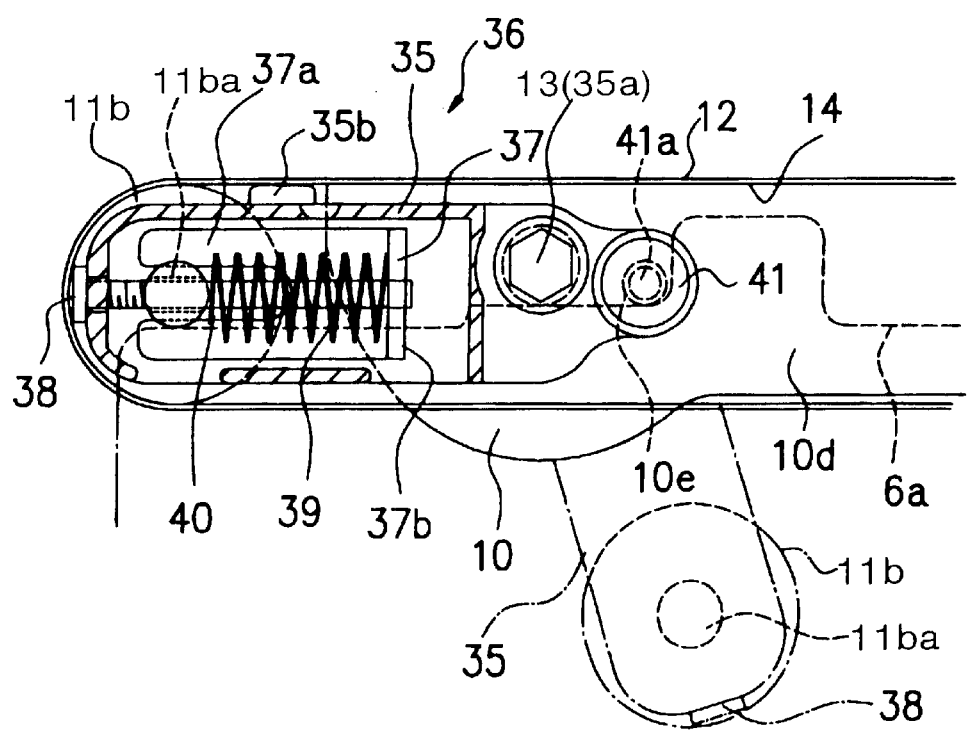
FIG. 11 is a side sectional view showing the constitution of the pivoting portion.

FIG. 10 is a plan sectional view showing the pivoting portion 35 and FIG. 11 is a side sectional view thereof. Each pivoting portion 35 is constituted as a housing having an inner space and at inside thereof, there are provided pressing means 36 for supporting a driven shaft 11ba of the driven roller 11b.

The pressing means 36 is constituted by a support piece 37, an adjustment screw 38 and an elastic member 39. The support piece 37 is constituted by a plate piece bent substantially in an L-like shape and a partially opened long hole 40 is formed at a front end of a bent piece 37a. The piece 37a is disposed along an outer face of the side plate 10d of the receive base 10 and directs an opening of the long hole 40 to a pivoting end of the pivoting portion 35 side in the above-described housing.

The driven shaft 11ba of the driven roller 11b is inserted to and supported by the long hole 40. The driven shaft 11ba is formed with a recess portion 11bd, the driven roller 11b can be moved along the long hole 40 and movement of the driven shaft 11ba in the axis line direction is restricted.

The adjustment screw 38 is inserted from outside of the pivoting end of the pivoting portion 35 into the housing. Further, the adjustment screw 38 is inserted to the front end portion of the driven shaft 11ba which is loosely inserted into the long hole 40 of the support piece 37 and is screwed to other piece 37b bent to be remote from the receive base 10 in the support piece 37. Therefore, by rotating the adjustment screw 38 to tighten to the other piece 37b of the support piece 37, the support piece 37 is pulled to the pivoting end side in the housing. Conversely, by rotating the adjustment screw 38 to loosen, the support piece 37 is made remote from the pivoting end side.

Further, the driven shaft 11ba rotatably supports the driven roller 11b by bearings 11bb arranged in the driven roller 11b. Therefore, even when the adjustment screw 38 is inserted through the front end portion of the driven shaft 11ba, rotation of the driven roller 11b is not hampered.

The elastic member 39 is constituted as a compression coil spring. The compression coil spring 39 is interposed between the other piece 37b of the support piece 37 and the driven shaft 11ba while being inserted by the adjustment screw 38. Further, the compression coil spring 39 presses the driven roller 11b always to the pivoting end side of the pivoting portion 35 via the driven shaft 11ba.

Further, by operating to tighten and loosen the adjustment screw 38, the compression coil spring 39 is expanded or contracted to thereby adjust the above-described pressing force.

Further, the pivoting portion 35 is held by a hold piece 41 such that the pivotal movement is restricted in a state in which the pivotal end is substantially directed to other end side of the receive base 10 in the length direction.

As shown by FIG. 10, the hold piece 41 is constituted by a hold pin 41a inserted into a hole portion 10e provided at the side plate 10d of the receive base 10 with a small amount of allowance (play). The hold pin 41a is always projected in a direction of inserting into the hole portion 10e by a spring member 41b.

According to the driven roller 11b which is made pivotable by the pivoting portion 35, unnecessary pivotal movement is restricted by the hold piece 41 within a range of permitting the pivotal movement by the amount of the allowance (play), mentioned above.

Further, the pivoting portion 35 is provided with a stopper 35b in contact with the receive base 10 to thereby restrict the pivotal movement in the upward direction in FIG. 11.

The belt 12 is constituted by canvas produced by sewing polyester fiber in a shape of a band ring. Inner and outer faces of the belt 12 are coated with urethane resin. As shown by FIG. 9(b), a bridge member 12a in an endless shape is formed at a central portion of an inner face of the belt 12.

As shown by FIG. 9(a), at central portions of the drive roller 11a and the driven roller 11b, there are formed groove portions 11ac and 11bc for receiving the bridge member 12a to thereby permit to bring other roller faces excluding the groove portions 11ac and 11bc into contact with the inner face of the belt 12.

Further, the receive base 10 is prevented from being brought into contact with the bridge member 12a by an interval between the bridge member 12a and the receive portion 10a.

The pivoting portion 35 expands the belt 12 between the drive roller 11a and the driven roller 11b in the state in which the pivoting end is pivoted toward the other end side of the receive base 10 in the length direction.

The bridge member 12a continuously formed in the length direction of the inner face of the belt 12, is engaged with the respective groove portions 11ac and 11bc to thereby prevent the belt 12 from meandering in rotating thereof.

The above-described carry unit 3 is mounted on the support unit 2 and is fixed thereto attachably and detachably by the clamps 30.

The side plates 6a and 6b of the support unit 2 are erected respectively in parallel with the length direction of the receive base 10 and are arranged to be slightly narrower than the receive base 10 in the width direction (inner direction) to avoid an amount of the plate thicknesses of the side plates 10d of the receive base 10 in the carry unit 3.

In the meantime, the carry unit 3 is provided with two pieces of the support rods 13 in parallel with each other in the width direction between the side plates 10d of the receive base 10. One of the support rods 13 is disposed at a vicinity of the drive roller 11a and the other thereof is the pivoting shaft 35a of the driven roller 11b.

According to the carry unit 3, the support rods 13, the pivoting shaft 35a (support rod 13) and the driven shaft 11ba are mounted to the support unit 2 by being supported by upper end edges of the side plates 6a and 6b of the support unit 2. That is, the side plates 6a and 6b constitute support plates for supporting the carry unit 3.

Figure 12:
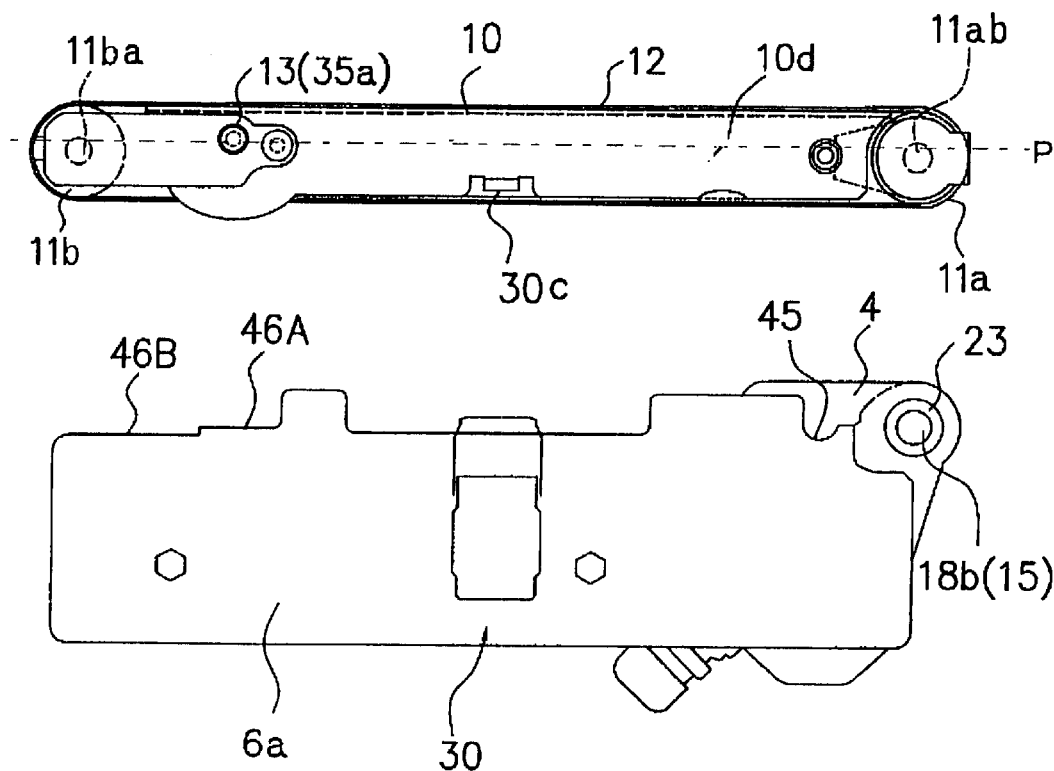
FIG. 12 is a front view showing a constitution of a support unit.

As shown by FIG. 12, at the upper end edges of the side plates 6a and 6b of the carry unit 2, the support rod 13 at a vicinity of the drive roller 11a is positioned by being fittedly inserted into receive grooves 45 substantially in a U-like shape from above.

Further, each of the upper end edges of the side plates 6a and 6b of the support unit 2 is respectively provided horizontally with a mounting portion 46A for receiving the pivoting shaft 35a and a mounting portion 46B for mounting the driven shaft 11ba.

An explanation will be given of attaching the carry unit 3 to the support unit 2 having the above-described constitution. The side plates 10d of the receive base 10 in the carry unit 3 are mounted from above to cover outer sides of the side plates 6a and 6b of the support unit 2.

Further, the support rod 13 is positioned by the receive grooves 45 and the pivoting shaft 35a and the driven shaft 11ba are mounted to the mounting portions 46A and 46B.

Thereafter, the clamps 30 are engaged with the engagement pieces 30c to thereby fix and hold the carry unit 3 at the upper portion of the support unit 2.

In this way, when the carry unit 3 is mounted and fixed onto the support unit 2, the support rod 13 and the pivoting shaft 35a (support rod 13) are fixed to be pressed to the upper end edges of the side plates 6a and 6b of the support unit 2 (receive grooves 45 and mounting portions 46A).

At this occasion, the driven shaft 11ba of the driven roller 11b is made pivotable by the pivoting portion 35 and is brought into contact with and supported by the upper end edges (mounting portions 46B) of the side plates 6a and 6b of the support unit 2.

Further, according to the driven roller 11b by which the driven shaft 11ba is supported to be brought into contact therewith, by forming the upper end edges of the side plates 6a and 6b (mounting portions 46B), the upper peripheral face is positioned to the same height as heights of the upper peripheral face of the drive roller 11a and the flat face 14 of the receive base 10 which are made the same previously.

Thereby, the belt 12 in the endless shape expanded between the drive roller 11a and the driven roller 11b, is disposed on and along the flat faces 14 without producing the stepped difference and carry performance of article is promoted. That is, the upper face of the belt 12 can pass the article stably without producing the stepped difference between the driven roller 11b and the flat faces 14, a noise component is not produced in the measuring signal and adverse influence is not effected in measuring the weight.

Further, the driven roller 11b is positioned by bringing the driven shaft 11ba into contact with the upper end edges of the side plates 6a and 6b of the support unit 2 (mounting portions 46B) and accordingly, high positioning accuracy is achieved. When positioning of the driven roller 11b is assumedly carried out by the pivoting portion 35 side, it is conceivable to position the driven roller 11b by bringing the receive base 10 and the pivoting portion 35 in contact with each other, however, when there is very small error in positioning by the receive base 10 and the pivoting portion 35, the error is significantly enlarged on the driven roller 11b side and positioning accuracy of the driven roller 11b cannot be achieved.

In the meantime, the carry unit 3 is constituted such that in the state in which the carry unit 3 is mounted and fixed onto the support unit 2, the pivoting shaft 35a is disposed at a position on the upper side of a base line P (refer to FIG. 12) connecting the rotating shaft 11ab of the drive roller 11a and the driven shaft 11ba of the driven roller 11b. Further, the mounting portions 46A at the upper end edges of the side plates 6a and 6b are formed above the mounting portions 46B to support the pivoting shaft 35a disposed at the upper position.

According to the constitution in which the pivoting shaft 35a is disposed at the upper side position in this way, the belt 12 in the endless shape is expanded between the drive roller 11a and the driven roller 11b and therefore, the tension of the belt 12 per se constitutes urging force for urging the driven shaft 11ba in the lower direction. Further, by the urging force, the pivoting portion 35 is inclined downwardly and the driven shaft 11ba disposed at the pivoting end is pressed to the side of the mounting portions 46B of the side plates 6a and 6b of the support unit 2.

Therefore, in the state in which the carry unit 3 is mounted and fixed onto the support unit 2, the driven roller 11b is pressed and held to the side plates 6a and 6b side and as mentioned above, the upper peripheral face of the driven roller 11b can be held to constitute the same height as the heights of the upper peripheral face of the drive roller 11a and the flat faces 14 of the receive base 10.

Further, the pivoting portion 35 for supporting the driven roller 11b is provided with the pressing means 36 which presses the driven roller 11b in the direction of separating from the drive roller 11a and exerts tension to the belt 12 in the endless shape expanded between the drive roller 11a and the driven roller 11b. Thereby, the pressing means 36 assists the urging force for tightening the belt 12 and urging the driven shaft 11ba to the upper end edges of the side plates 6a and 6b of the support unit 2.

At this occasion, by operating to tighten or loosen the adjustment screw 38 of the pressing means 36, the compression coil spring 39 is expanded or contracted and the tension exerted to the belt 12 can be adjusted.

Further, in the case in which the pivoting shaft 35a is disposed on the upper side of the base line connecting the rotating shaft 11ab of the drive roller 11a and the driven shaft 11ba of the driven roller 11b, at the side plates 6a and 6b, the mounting portions 46A may not necessarily be formed above the mounting portions 46B. That is, when the diameter of the pivoting shaft 35a is enlarged, the mounting portion 46A and the mounting portion 46B can be formed at the same stage.

Further, although at the side plates 6a and 6b, the positions of receiving the support rod 13 at the vicinity of the drive roller 11a are constituted by the receive grooves 45 substantially in the U-like shape to thereby position the support rod 13 (carry unit 3), when the carry unit 3 is positioned by other portions, the receive grooves 45 may not be constituted and flat upper end edges for mounting the support rod 13 may simply be constituted. That is, the mounting portions 46A, the mounting portions 46B and the receive grooves 45 may be replaced by a continuous flat constitution.

Figure 13:
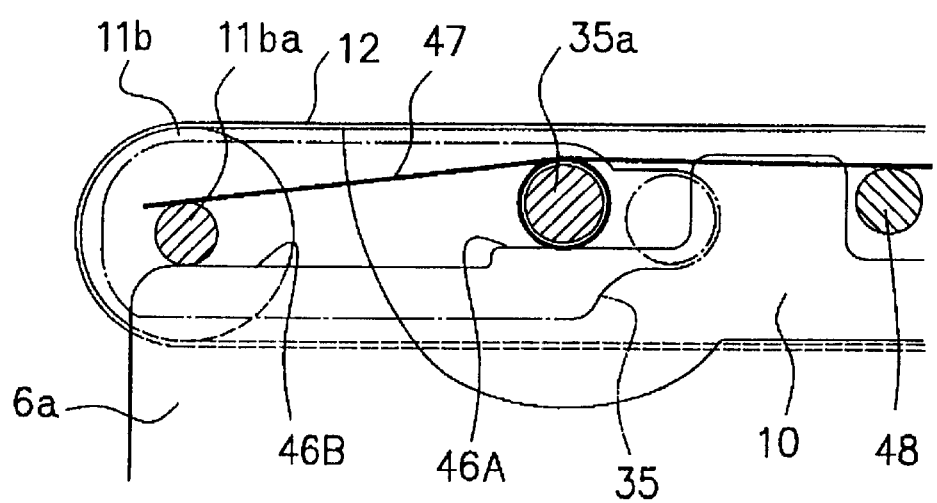
FIG. 13 is an outline view showing other constitution of a driven roller.

Further, when the carry unit 3 is mounted and fixed onto the support unit 2, the position of the pivoting shaft 35a may not be constituted to be disposed on the upper side of the base line P connecting the rotating shaft 11ab of the drive roller 11a and the driven shaft 11ba of the driven roller 11b. In this case, as shown by FIG. 13, there may be constructed a constitution in which one end of a spring member 47 such as a torsion coil spring as urging means is placed on the driven shaft 11ba and the other end thereof is placed on a pin 48 provided at the receive base 10 and the driven shaft 11ba is urged to the mounting portions 46B side of the side plates 6a and 6b.

Further, although according to the embodiment, the side plates 6a and 6b constituting the support unit 2 are used as the support plates for supporting the support rods 13 on the carry unit 3 side, the pivoting shaft 35a and the driven shaft 11ba, the side plates 6a and 6b may be constituted by other constitution, the support plates in a plate-like shape may be provided to be erected to thereby support the support rod 13, the pivoting shaft 35a and the driven shaft 11ba on the carry unit 3 side.

Next, an explanation will be given of attachment and detachment operation of the belt 12 from the carry unit 3.

Similar to removal of the carry unit 3, the belt 12 is removed from the carry unit 3 for periodical cleaning (sterilization, decontamination) or maintenance.

Figure 14:
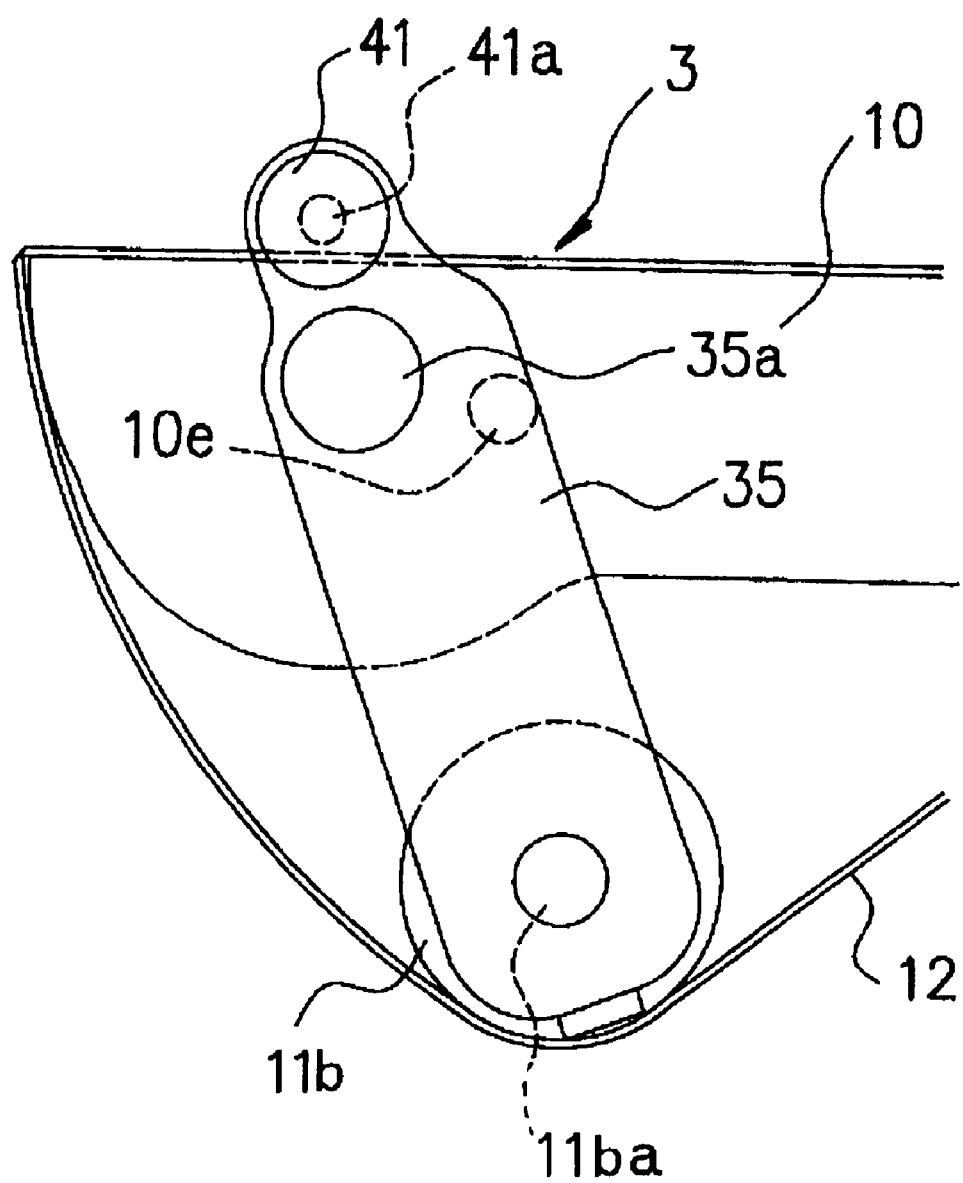
FIG. 14 is a front view showing pivoting operation of the driven roller.

The belt 12 is removed after removing the carry unit 3 as described above. In removing the belt 12, as shown by FIG. 14, the pivoting portion 35 provided at the carry unit 3 is pivoted. According to the embodiment, the pivotal movement of the pivoting portion 35 is restricted by the hold piece 41 and accordingly, the hold piece 41 is drawn and the hold pin 41a is drawn from the hole portion 10e provided at the side plate 10d to thereby release the restriction of the pivotal movement.

Further, by pivoting the pivoting portion 35, the driven roller 11b approaches the drive roller 11a, the tension of the belt 12 per se is released and the belt 12 is removed from the carry unit 3 (respective rollers 11a, 11b).

In this way, by pivoting the driven roller 11b by the pivoting portion 35, the driven roller 11b and the drive roller 11a are made proximate to each other at an instance and accordingly, the belt 12 can easily be removed. Further, by pivoting the driven roller 11b by the pivoting portion 35, the interval of making the driven roller 11b and the drive roller 11a proximate to each other can be enlarged and accordingly, even when the bridge member 12a is formed at the inner face of the belt 12 as mentioned above, the belt 12 can be removed without being caught by the bridge member 12a.

Thereafter, in attaching the belt 12 to the carry unit 3, the belt 12 can simply be attached thereto by operation reverse to the above-described.

That is, the belt 12 may be placed on the respective rollers 11a and 11b and the pivoting portion 35 may be returned to the original position. The driven roller 11b is constituted to be pivoted by the pivoting portion 35 and when the pivoting portion 35 is returned to the original position, the interval between the driven roller 11b and the drive roller 11a is not changed. Therefore, the belt 12 is spontaneously returned to the original state.

Further, when the belt 12 is attached between the drive roller 11a and the driven roller 11b, even when the tension of the belt 12 per se is more or less different from that in the original state by, for example, cleaning the belt 12 or interchanging the belt 12, the difference is absorbed by the compression coil spring 39 of the pressing means 36.

Further, when the tension of the belt 12 per se is significantly different from that in the original state, the tension of the belt 12 may be adjusted by changing the pressing force by the adjustment screw 38 of the pressing means 36.

BEST MODE 4 FOR CARRYING OUT THE INVENTION

Next, an explanation will be given of a metal detector according to the present invention. The conveyor 1 explained in the above-described embodiments is not limited to the measuring machine but is applicable to a metal detector.

Figure 15:
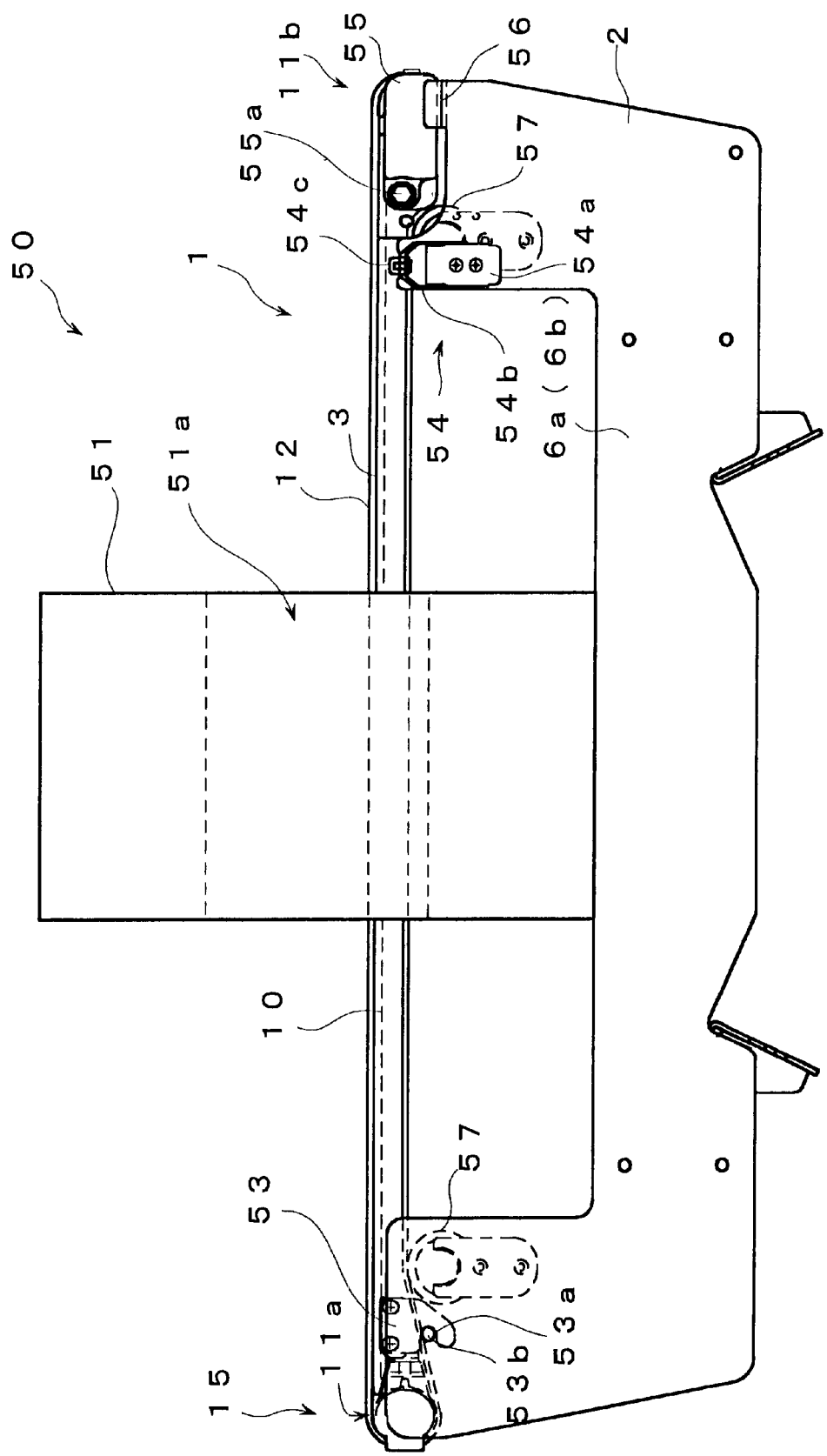
FIG. 15 is a front view showing a metal detector according to a fourth embodiment of the present invention.
Figure 16:
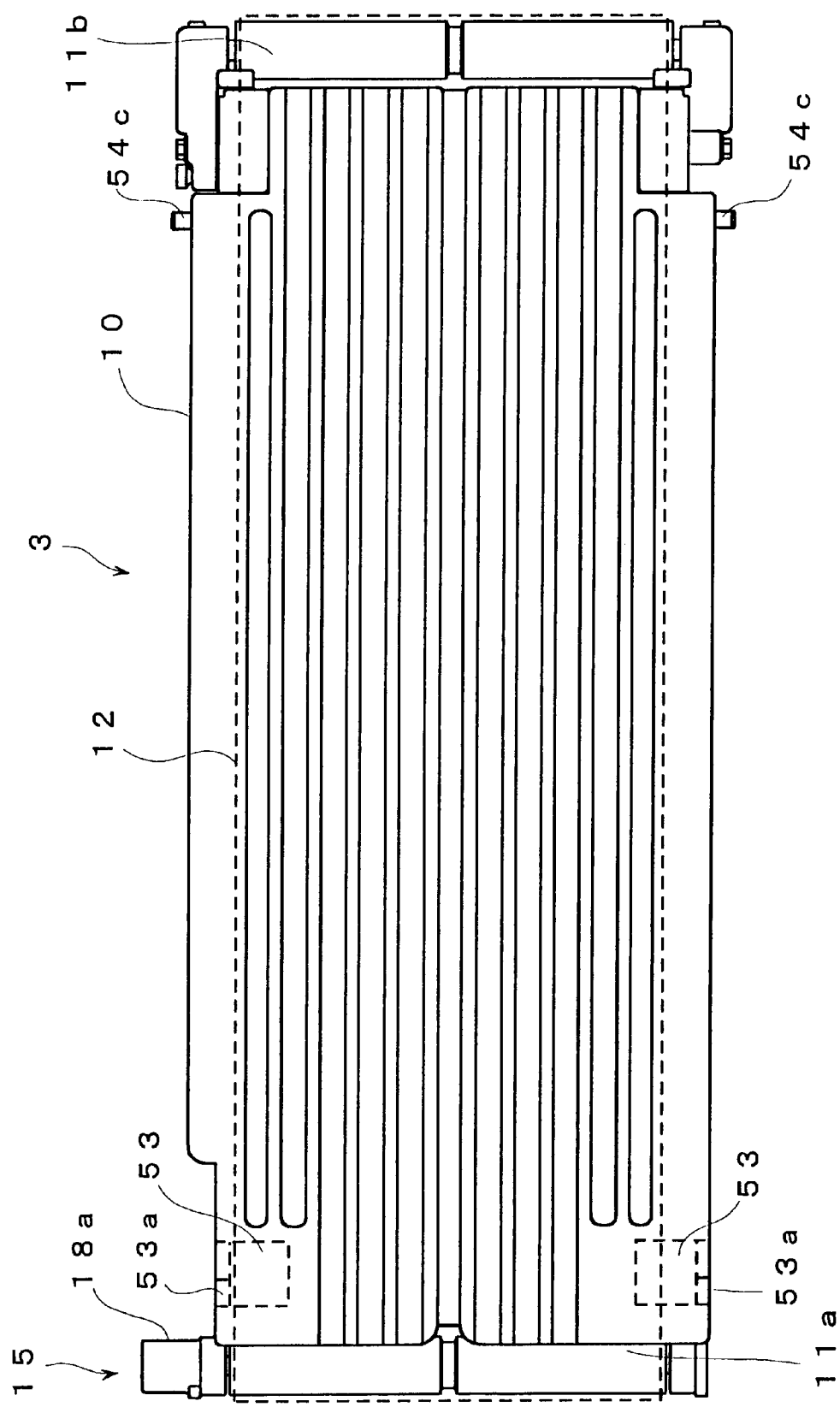
FIG. 16 is a plane view showing a carry unit used in the metal detector.

FIG. 15 is a front view showing a metal detector 50 and FIG. 16 is a plane view showing the carry unit 3.

Recess portions are formed at central portions of the pair of side plates 6a and 6b constituting the support unit 2 and a detection head 51 for detecting metal is arranged in the recess portions. The detection head 51 has an opening portion 51a formed therein. The detection head 51 is in a substantially rectangular shape in side view. A transmission coil and a reception coil (not illustrated) for detecting metal are provided at inside of the detection head 51. The opening portion 51a constitutes an inspection space and while carrying the article by the conveyor 1, a metal object in the article is detected in passing through the opening portion 51a.

According to such a metal detector 50, the detection head 51 is constituted by the above-described closed shape and therefore, the carry unit 3 of the conveyor 1 cannot be attached to and detached from the side portion. Therefore, according to the present invention, there is constructed a constitution in which a total of the carry unit 3 is attached and detached through the opening portion 51a of the detection head 51.

The receive base 10 of the carry unit 3 is molded by nonmetallic material, for example, resin such that influence is not effected to detection of metal by the detection head 51. The drive roller 11a and the driven roller 11b are respectively provided at both end portions of the receive base 10 and the connecting piece 18a constituting one side of the connecting portion 15 is provided at one end portion of the drive roller 11a.

Fixing pieces 53 respectively having engagement grooves 53a are provided at both side portions of the receive base 10 on the drive roller 11a side. Engagement grooves 53a are opened toward the length direction of the carry unit 3. Further, engagement pieces 54c of clamps 54 are respectively provided at the both side portions on the driven roller 11b side.

The carry unit 3 is constructed by an attachable and detachable constitution disposed between the pair of side plates 6a and 6b of the support unit 2.

Engagement pins 53b are formed to project at the side plates 6a and 6b at positions opposed to the engagement grooves 53a of the carry unit 3. Engagement pins 53b position and support the drive roller 11a side of the carry unit 3 by engaging with the engagement grooves 53a from side portions.

Further, cases 55 for axially supporting rotation of the driven roller 11b are respectively provided at both end portions of the driven roller 11b. Hold pieces 56 for supporting bottom portions of the cases 55 are provided to bend horizontally at the side plates 6a and 6b for supporting the driven roller 11b side of the carry unit 3. The case 55 is constituted to be pivotable downwardly centering on a shaft 55a and by the pivotal movement, the belt 12 can be attached and detached from side portions of the carry unit 3 by loosening tension of the belt 12.

Further, the clamps 54 (levers 54a and claws 54b) are operably provided at positions in correspondence with the engagement pieces 54c of the carry unit 3 and by operating the levers 54a, the engagement pieces 54c are engaged with the claws 54b to thereby fix and hold the driven roller 11b side of the carry unit 3.

According to the above-described metal detector, in order to promote detection accuracy of the detection head 51, the opening portion 51a is formed to open as small as possible. Therefore, it is preferable that the height of the carry unit 3 passing through the opening portion 51a is low and the belt 12 needs to be proximate to the surface and the rear face of the receive base 10.

Therefore, there is constructed a constitution in which tension rollers 57 are respectively provided at both end portions of the side plates 6a and 6b and the belt 12 is provided proximately to the rear face side of the receive base 10.

Further, although not illustrated, the motor unit 4 is attachable to and detachable from the side plate 6b provided at the one end portion side of the drive roller 11a, that is, at a depth position of FIG. 15 by the above-described constitution and the connecting piece 18b provided on the output shaft 4b side is connectable to the connecting piece 18a of the drive roller 11a.

Figure 17:
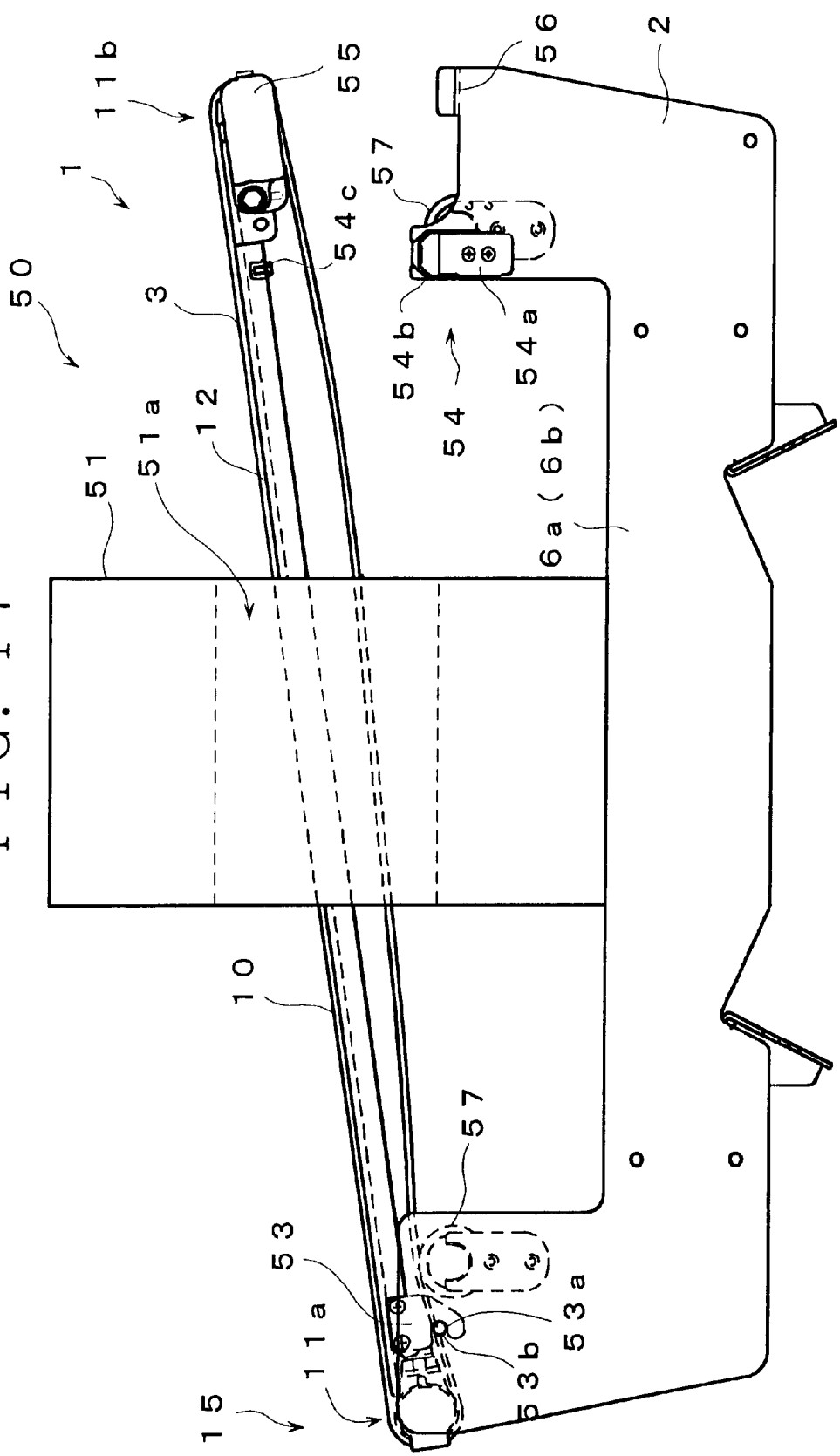
FIG. 17 is a front view showing attachment and detachment operation of the carry unit.
Figure 18A:
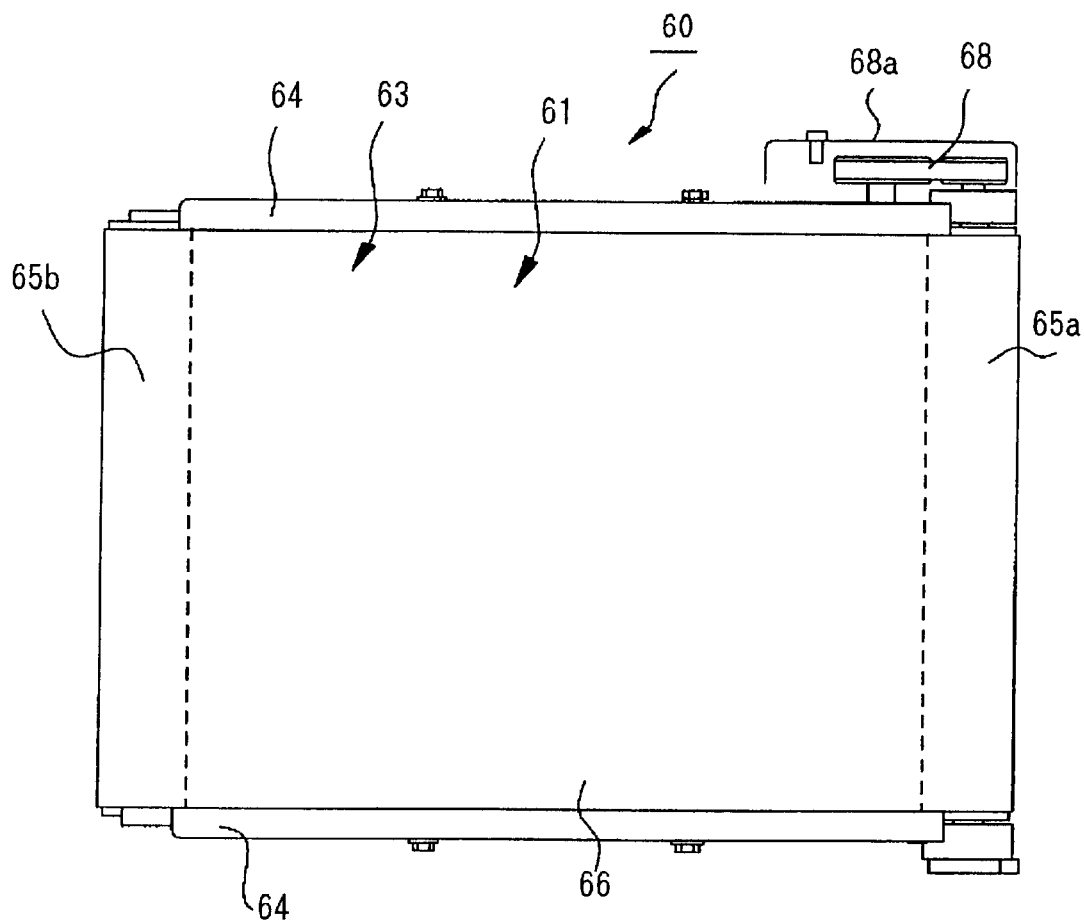
FIG. 18(a) illustrates a plane view showing a conventional measuring machine.
Figure 18B:
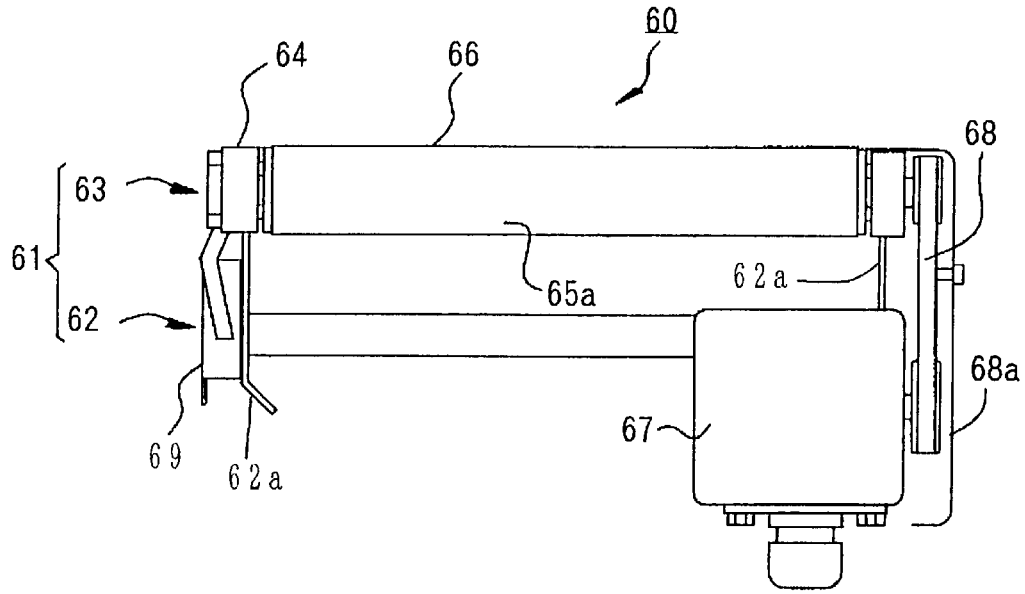
FIG. 18(b) illustrates a side view showing a conventional measuring machine.

An explanation will be given of the attachment and detachment operation of the carry unit 3 by the above-described constitution in reference to a view of operation of FIG. 17. The carry unit 3 can be attached to the support unit 2 from an upper position. That is, the carry unit 3 is made to pass through the opening portion 51a of the detection head 51 by disposing the side of the drive roller 11a at a front end thereof and the engagement grooves 53a of the fixing pieces 53 are engaged to the engagement pins 53b of the side plates 6a and 6b.

Next, the side of the driven roller 11b is fallen, the cases 55 are mounted on the hold pieces 56, the horizontal position of the driven roller 11b is positioned and thereafter, the engagement pieces 54c and the claws 54b are engaged and fixed to each other by operating the levers 54a of the clamps 54.

Thereafter, when the connecting pieces 18a and 18b of the connecting portion 15 are connected at one end portion of the drive roller 11a, the drive force of the motor unit 4 can be connected to the drive roller 11a.

Thereby, the carry unit 3 can be fixed and held onto the support unit 2. In the meantime, in removing the carry unit 3, a procedure reverse to the above-described may be carried out. The total of the carry unit 3 can be attached to the support unit 2 from above by passing through the opening portion 51a of the detection head 51.

In this way, even in the case of the metal detector having the detection head 51, the carry unit 3 is easily attachable to and detachable from the support unit 2 without changing a basic constitution thereof.

INDUSTRIAL APPLICABILITY

As described above, the conveyor according to the present invention is applicable to a measuring machine for measuring mass of an article while carrying the article, a metal detector for detecting mixture of a metal object in the article while carrying the article and the like and is useful in apparatus dealing with food or the like which needs to maintain sanitary thereof and apparatus frequently attaching and detaching a carry unit for cleaning, maintenance or interchange thereof.

What is claimed is:

1. A conveyor comprising:

a support unit having first and second clamp means;

a motor unit including a motor, an output shaft for outputting a rotational force of the motor having a first connecting piece provided at one end thereof and having first engagement teeth projecting outwardly from the output shaft, and third clamp means for engaging the first clamp means so that when the first and third clamp means are engaged, the motor unit is fixed to the support unit, and when the first and third clamp means are disengaged, the motor unit can be removed from the support unit; and a carry unit including a drive roller having a second connecting piece provided at one end thereof and having a second engagement teeth projecting outwardly from the drive roller to be engageable with the first engagement teeth when aligning together, said drive roller being rotated by receiving the rotational force, a driven roller, an endless belt expanded between the drive roller and the driven roller, and fourth clamp means for engaging the second clamp means so that when the second and fourth clamp means are engaged, the carry unit is fixed to the support unit, and when the second and fourth clamp means are disengaged, the carry unit can be removed from the support unit;

wherein when the first and third clamps are released, the motor unit is movable relative to the drive roller and an engagement between the first and second connecting pieces is released to thereby make the carry unit attachable to and detachable from the support unit in up/down directions; only when the first and second connecting pieces engage together, said motor unit is fixed to the support unit; and only when said motor unit is disengaged from the support unit, the first and second connecting pieces are separated from each other.

2. The conveyor according to claim 1, further comprising a protection case attached to the carry unit for positioning axis centers of the output shaft of the motor unit and the drive roller by engaging the output shaft and the drive roller with each other and covering a connected portion thereof.

3. The conveyor according to claim 1, further comprising an intermediate disk made of a resin fixed to one of the first and the second connecting pieces, said first and second connecting pieces being made of metal and a drive force in connecting the first and the second connecting pieces being transmitted therebetween via the intermediate disk.

4. The conveyor according to claim 1, further comprising a fall preventive piece provided between the motor unit and the support unit, said fall preventive piece supporting the motor unit when the first and second clamps are released to thereby prevent the motor unit from falling from the support unit.

5. The conveyor according to claim 1, wherein the motor unit is located substantially inside the support unit so that a gravitational center of the motor unit is located close to a gravitational center of the support unit.

6. A measuring machine using the conveyor according to claim 1 comprising a measuring unit, on which the support unit is mounted and fixed, said measuring unit measuring a mass of an article carried and moved on the carry unit.

7. The conveyor according to claim 1, wherein said motor unit 4 can be attached to and detached from the support unit only when the carry unit is fixed to the support unit.

8. The conveyor according to claim 1, wherein each of said first and second engagement pieces has a cylindrical wall with the teeth circularly arranged alternately to form mounting and valley portions, outer surfaces of the mounting and valley portions being inclined relative to a rotation direction thereof.

9. The conveyor according to claim 8, wherein said protection case has a hollow shape with two opposite openings to receive the output shaft and the drive roller from the opposite openings.

* * * * *